United States Patent
Zheng et al.

(10) Patent No.: US 12,306,368 B1
(45) Date of Patent: May 20, 2025

(54) METHOD FOR STUDYING INTERANNUAL VARIATION OF MARINE HEATWAVES IN SOUTH INDIAN OCEAN

(71) Applicant: Guangdong Ocean University, Guangdong (CN)

(72) Inventors: Shaojun Zheng, Guangdong (CN); Chuang Li, Guangdong (CN); Huangyuan Shi, Guangdong (CN); Li Yan, Guangdong (CN); Chenyu Zheng, Guangdong (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 19/031,941

(22) Filed: Jan. 18, 2025

Related U.S. Application Data

(63) Continuation of application No. PCT/CN2025/072399, filed on Jan. 15, 2025.

(30) Foreign Application Priority Data

Sep. 9, 2024 (CN) .......................... 202411252369.1

(51) Int. Cl.
*G01W 1/10* (2006.01)

(52) U.S. Cl.
CPC ..................... *G01W 1/10* (2013.01)

(58) Field of Classification Search
CPC ....................................................... G01W 1/10
See application file for complete search history.

(56) References Cited

FOREIGN PATENT DOCUMENTS

| CN | 116307853 A | * | 6/2023 | ............ G06F 17/18 |
|---|---|---|---|---|
| CN | 116822381 A | | 9/2023 | |

* cited by examiner

*Primary Examiner* — Yoshihisa Ishizuka

(57) ABSTRACT

A method for studying interannual variation of marine heatwaves in the South Indian Ocean includes: investigating spatial distribution features and linear variation trend features of marine heatwaves in the South Indian Ocean according to obtained data; analyzing the relationship between an intensity of marine heatwaves in the South Indian Ocean and an El Niño-Southern Oscillation (ENSO) process; analyzing a spatial evolution of marine heatwaves in the South Indian Ocean and sea surface temperature (SST) anomalies during an El Niño event; analyzing energy contribution of ocean and atmosphere to marine heatwave events during the El Niño event; investigating physical mechanisms of the marine heatwaves in the South Indian Ocean; and determining whether the marine heatwaves in the South Indian Ocean are influenced by shortwave radiation and latent heat modulated by the ENSO process. The present disclosure reveals that marine heatwaves occur during the El Niño event in the South Indian Ocean.

3 Claims, 15 Drawing Sheets

METHOD FOR STUDYING INTERANNUAL VARIATION OF MARINE HEATWAVES IN SOUTH INDIAN OCEAN

CROSS-REFERENCE TO RELATED APPLICATIONS

This application is a continuation of PCT/CN2025/072399, filed on Jan. 15, 2025 and claims priority of Chinese Patent Application No. 202411252369.1, filed on Sep. 9, 2024, the entire contents of which are incorporated herein by reference.

TECHNICAL FIELD

The present disclosure relates to the interannual variation of marine heatwaves, and specifically relates to a method for studying interannual variation of marine heatwaves in the South Indian Ocean.

BACKGROUND

Marine heatwaves refer to extreme high-temperature events occurring in a given sea area, where the sea surface temperature (SST) exceeds a certain threshold for more than five consecutive days, lasting for several months possibly and covering thousands of square kilometers. Since the industrial revolution, as greenhouse gases are emitted increasingly, the greenhouse effect has caused a large amount of extra heat to be absorbed into the ocean, with the energy absorbed mainly concentrated in the upper layer of 700 meters or more of seawater, leading to a significant rise in SST. Under this circumstance, the mean intensity, duration, and frequency of marine heatwaves in most of oceans worldwide present a clear linear increase trend. Statistically, the number of days with marine heatwave occurring has increased by 54% from 1925 to 2016 globally.

In recent years, extreme marine heatwaves exert severe destructive impacts on ecosystems and human economies and societies. Heatwaves can cause massive breed of harmful algae, resulting in a reduction in nutrient substances from the ocean and an increase in mortality rates among birds, fish, and marine mammals. In addition, extremely high-temperature seawater causes bleaching of numerous corals and death of seagrass, making devastating effects on marine ecological structures. Marine heatwaves not only disrupt marine ecosystems but also bring huge losses to human economies and societies. Accordingly, in recent years, an increasing number of scientists begin to focus on and study marine heatwaves. Marine heatwaves occur frequently in various sea areas worldwide, with different driving factors for marine heatwaves in different regions and at different times. In existing studies, some marine heatwave events and physical mechanisms have been investigated. For example, the intense marine heatwave event occurred in the northern region of Mediterranean in 2003 was closely related to unusually high air temperatures and reduced wind velocity over the sea surface. The marine heatwave event in western region of Australia between 2010 and 2011 was closely linked to the La Niña event; and the La Niña event caused the Leeuwin Current to bring more warm water from low latitudes and intensified the ocean-atmosphere heat flux on the west coast of Australia, jointly leading to an increase in SST. The record-breaking marine heatwave event occurred in the northeastern Pacific Ocean between 2013 and 2015, known as "The Blob", was primarily influenced by an anomalous high-pressure ridge over the northeastern Pacific and the weakening of surface wind associated with the Aleutian Low. Additionally, the marine heatwave event in the northeastern Pacific Ocean during the summer of 2019, known as "Blob 2.0", was related to the continuous weakening of the high-pressure system over the North Pacific. The relatively intense marine heatwave event occurred in the southwestern region of Atlantic Ocean in 2017 was regulated by tropical intraseasonal oscillation.

As is well known, marine heatwaves refer to abnormal warming events in the ocean. The SST in the Indian Ocean exhibits significant interannual variation, and the ocean and atmospheric variations of the Indian Ocean are closely related to important climate phenomena such as the El Niño-Southern Oscillation (ENSO) and the Indian Ocean Dipole (IOD). During El Niño events, the SST in the equatorial Pacific Ocean rises, which affects the SST in the eastern Indian Ocean through the "atmospheric bridge", and the peak warming phase of sea temperature in the Indian Ocean lags that in the equatorial central Pacific by 3 months. Furthermore, it has found that sea temperature in the Indian Ocean is closely related to the Asian summer monsoon. Research on marine heatwaves in the Indian Ocean region indicates that summer marine heatwaves in the Bay of Bengal are regulated by El Niño and are associated with atmospheric heating and the deepening of the thermocline. Additionally, the equatorial western Indian Ocean is affected by descending Rossby waves, leading to enhanced convergence of upper-layer seawater and inhibiting the upwelling of cold water, thereby triggering marine heatwave events. From April to June 2010, the marine heatwave lasting for maximum days was observed in the Arabian Sea, and it is pointed out in research that which was related to less latent heat loss and a reduced mixed layer depth. Through the above analysis, the problems and deficiencies existing in prior art are as follows. The research on marine heatwaves in the Indian Ocean mainly focuses on regions such as the Arabian Sea, the Bay of Bengal, the equatorial western Indian Ocean, and the southeastern Indian Ocean. However, the understanding of the mechanisms of marine heatwaves in the South Indian Ocean is still incomplete, requiring further in-depth study. The analysis of influencing factors is not comprehensive: there is insufficient comprehensive study on the mechanisms of marine heatwaves in the South Indian Ocean, especially the connection between marine heatwaves and large-scale climate processes.

SUMMARY

An objective of the present disclosure is to provide a method for studying interannual variation of marine heatwaves in the South Indian Ocean, addressing the unclear issue regarding the interannual variation and dynamic mechanisms of marine heatwaves in the South Indian Ocean (60° E-90° E, 15° S-25° S). Through the study of the present disclosure, it reveals that various features of marine heatwaves in the South Indian Ocean show an increasing trend, with heatwave intensity lagging El Niño by 3 months. Through the calculation of heat budget in the mixed layer, it is determined that heatwaves are related to latent heat and shortwave radiation. Through composite analysis, it reveals that during El Niño events, there is a decrease in low cloud cover and an increase in high cloud cover within the study region, and the depth of the mixed layer is decreased, which favors the penetration of shortwave radiation to the ocean surface and enhances warming. Additionally, northwest wind during El Niño events suppresses the southeast wind in climatic state, reducing ocean evaporation and the loss of latent heat energy, thereby favoring temperature increase.

To realize the above objective, the present disclosure provides a method for studying interannual variation of marine heatwaves in the South Indian Ocean, including the following steps:

step 1, acquiring SST data, an Optimally Interpolated Sea Surface Temperature (OISST) dataset, European Centre for Medium-Range Weather Forecasts (ECMWF) Reanalysis V5, three-dimensional temperature and salinity data, and Niño 3.4 index data;

step 2, investigating spatial distribution features and linear variation trend features of marine heatwaves in the South Indian Ocean according to obtained OISST data;

selecting a region of 60° E-90° E, 15° S-25° S as a study region for the marine heatwaves in the South Indian Ocean, where marine heatwaves exist in the region, with a mean intensity of the marine heatwaves of 1.20° C., a maximum intensity of 1.50° C., a cumulative intensity of 18.06° C./day, a duration of 14.12 days, a frequency of 2.74 times, and a total number of days of 45.22 days;

step 3, calculating a Niño 3.4 index according to the obtained OISST data, and performing a lead-lag correlation analysis between the Niño 3.4 index and the intensity of marine heatwaves in the South Indian Ocean, to analyze the relationship between the intensity of marine heatwaves in the South Indian Ocean and ENSO process;

a consistent temporal variation is present between a time series of the intensity of marine heatwaves in the South Indian Ocean calculated based on OISST and the Niño 3.4 index, and the lead-lag correlation analysis indicates that a positive correlation relationship is present between the time series of the intensity of marine heatwaves in the South Indian Ocean and the Niño 3.4 index lagging by 3 months;

step 4, analyzing a spatial evolution of the marine heatwaves in the South Indian Ocean and SST anomalies during an El Niño event;

the lead-lag correlation analysis in step 3 indicates that the positive correlation relationship is present between the time series of the intensity of marine heatwaves in the South Indian Ocean and the Niño 3.4 index lagging by 3 months, and the spatial evolution of the marine heatwaves in the South Indian Ocean during the development of El Niño is further analyzed in detail, that is, spatial evolution features of the marine heatwaves in the South Indian Ocean from 6 months before to 5 months after the peak of El Niño; and the spatial evolution of SST anomalies in the South Indian Ocean during the development of El Niño is consistent with that of the marine heatwaves in the South Indian Ocean, indicating that the El Niño event is capable of regulating the intensity of marine heatwaves in the South Indian Ocean by influencing SST;

step 5, analyzing energy contribution of the ocean and atmosphere to marine heatwave events during the El Niño event through a heat budget of mixed layer;

in step 4, it obtains that the El Niño event is capable of regulating the intensity of marine heatwaves in the South Indian Ocean by influencing SST, and combined with the SST data, ECMWF Reanalysis V5 data, and the three-dimensional temperature and salinity data, quantitative analysis of the energy contribution of the ocean and atmosphere to marine heatwave events during the development of El Niño is further performed using a heat budget equation of the mixed layer, to investigate physical mechanisms of the marine heatwaves in the South Indian Ocean; and from 6 months before to 5 months after the peak of El Niño, a temporal variation of net surface heat flux is consistent with an SST trend term, indicating that the net surface heat flux plays a dominant role in variations of the marine heatwaves in the South Indian Ocean; and step 6, determining whether the marine heatwaves in the South Indian Ocean are affected by shortwave radiation and latent heat modulated by the ENSO process through regression analysis and composite analysis;

in step 5, it obtains that the net surface heat flux plays a dominant role in variations of marine heatwaves in the South Indian Ocean, and combined with ECMWF Reanalysis V5 data, contributions of 4 components of the net surface heat flux: latent heat, sensible heat, longwave radiation, and shortwave radiation, are further analyzed, to obtain that variations in the net surface heat flux are influenced by shortwave radiation and latent heat;

since the shortwave radiation is related to cloud cover, to investigate the impact of the El Niño event on cloud cover in the South Indian Ocean, low cloud cover, high cloud cover, and total cloud cover from ECMWF Reanalysis v5 are regressed onto the Niño 3.4 index, to analyze the impact of the El Niño event on low cloud cover, high cloud cover, and total cloud cover;

since a decrease in a depth of the mixed layer favors an increase in the net surface heat flux, to investigate the impact of the El Niño event on the depth of the mixed layer in the South Indian Ocean, the depth of the mixed layer is calculated using the three-dimensional temperature and salinity data; and since variations in latent heat are related to wind field, to investigate the impact of the El Niño event on wind field, sea-level pressure and wind field from ECMWF Reanalysis v5 are regressed onto the Niño 3.4 index, to analyze the impact of wind field on variations in latent heat.

Preferably, in step 2, within the study region, the frequency, duration, total number of days, and cumulative intensity increase across the South Indian Ocean, which are 1.01±0.25 times/decade, 4.18±1.10 days/decade, 27.95±7.04 days/decade, and 5.70±1.59° C.·days/decade, respectively, with the increase in the western region of the South Indian Ocean higher than the eastern region; and in the western region of the South Indian Ocean, a frequency trend of marine heatwaves reaches 2 times per decade; the trends in duration, total number of days, and cumulative intensity are similar in spatial distribution, with the highest increase in duration reaching 7.5 days per decade in the western region, the increase in total number of days reaching 40 days per decade, and the increase in cumulative intensity reaching 10° C. per decade.

Weighted averages of frequency, duration, total number of days, maximum intensity, and cumulative intensity in marine heatwave regions in the South Indian Ocean have all reached the 95% confidence test.

Preferably, in step 3, regions where the Niño 3.4 index exceeds 0.5 standard deviation are considered as El Niño events; and the positive correlation relationship refers to a maximum correlation coefficient being up to 0.60 between the time series of intensity of marine heatwave in the South Indian Ocean and the Niño 3.4 index lagging by 3 months, which passes the 95% confidence test.

Preferably, in step 4, 4 months before the peak of the El Niño event, a strong marine heatwave value with an intensity of 0.4° C. or more appears at the location of 74°E, 20° S; 1 month before the peak of the El Niño, a tilted high-intensity belt of marine heatwaves is formed; 2 months after the peak of El Niño, a high-value region begins to expand, and ultimately, 4 months after the peak, both the intensity and scope are maximum. Therefore, El Niño event is capable of affecting the intensity of marine heatwaves by influencing SST.

Preferably, in step 5, the heat budget equation of the mixed layer is:

$$\frac{dT}{dt} = \frac{Q_{net}}{\rho C_p h} - V \cdot \nabla T - \frac{\omega_e (T - T_d)}{h} + R_{es} \quad (1)$$

where dT/dt represents a trend term of temperature, $Q_{net}/\rho C_p h$ represents a sea surface heat forcing term, indicating the contribution of sea surface heat flux to variations in SST, $Q_{net}$ representing a net surface heat flux, formed by the sum of longwave radiation, shortwave radiation, sensible heat, and latent heat; V·∇T represents a horizontal advective heat flux term, and $\omega_e(T-T_d)/h$ represents a vertical h entrainment term; the residual term $R_{es}$ contains turbulent mixing at the bottom of a mixed layer, horizontal mixing and diffusion, and numerical model errors; ρ=1025 kg/m³ and $C_p$=3990 J/(kg·° C.) represent the density and specific heat capacity of seawater, respectively; h represents the depth of the mixed layer, T represents an average temperature of the mixed layer, and $T_d$ represents a temperature at the bottom of the mixed layer; V(u, v) represents a velocity vector, u and v representing zonal and meridional current velocities, respectively; and $\omega_e$ represents a vertical entrainment velocity, $$\omega_e = \frac{dh}{dt} + h\left(\frac{\partial u}{\partial x} + \frac{\partial v}{\partial y}\right).$$

More preferably, in Equation (1), a value of $T-T_d$ is 0.5° C.

Preferably, in step 6, the analysis of the impact of the El Niño event on low cloud cover, high cloud cover, and total cloud cover reveals that the low cloud cover in the South Indian Ocean is negative anomaly; and the spatial evolution of low cloud cover and high cloud cover anomalies from 6 months before to 5 months after the El Niño event shown in the composite analysis indicates that the decrease in low cloud cover favors the penetration of shortwave radiation into the ocean, promoting ocean warming and the generation of marine heatwaves.

More preferably, high cloud cover in the equatorial Pacific increases, and high cloud cover also increases in the South Indian Ocean, with an increase amplitude of 0.05, and a tilted "northwest-southeast" belt of increased high cloud cover emerges in the South Indian Ocean; during El Niño period, the total cloud cover over the South Indian Ocean is in an increasing trend, which aligns with variations in total cloud cover over the equatorial Pacific; with the reduction in low cloud cover, shortwave radiation penetrates through the low cloud cover to enter the ocean surface, leading to an increase in SST; and the increased SST promotes air ascent, favoring the formation of high cloud cover, and creating a positive feedback loop;

a lag relationship exists between low cloud cover and marine heatwaves; and the reduction in low cloud cover leads to an increase in SST, and the SST is maximum in 3 to 4 months after the El Niño peak period; and before and after the peak of the El Niño event, the high cloud cover over the South Indian Ocean shows positive anomalies, with the maximum positive anomaly in high cloud cover occurring 3 to 4 months after the peak of the El Niño event.

Preferably, in step 6, the composite analysis of depth of mixed layer indicates that the depth of mixed layer of the South Indian Ocean is in a decreasing trend from 6 months before to 5 months after the El Niño event, which favors ocean surface warming and promotes the formation of marine heatwaves; the depth of mixed layer in the study region decreases overall, with widespread negative anomalies in the western part of the study region 6 months before the peak of the El Niño event; a positive anomaly in the depth of mixed layer, with a value of 6 meters, exists at 80° E within the study region; as El Niño develops, this positive anomaly gradually weakens and turns into a negative anomaly 3 months after the peak; and the negative anomaly signal in the depth of mixed layer at 60° E gradually intensifies, being maximum 1 month after the peak.

Preferably, in step 6, the analysis of the impact of wind field on latent heat variations reveals that, during the El Niño event, the high pressure of the South Indian Ocean favors an increase in SST; meanwhile, southeast wind in climatic state is weakened by anomalous northwest wind, and moisture evaporation and latent heat energy loss at the ocean surface are further reduced, contributing to the increase in SST and the formation of heatwaves; and the composite analysis of geopotential height anomalies and wind velocity anomalies at 850 hPa in the South Indian Ocean from 6 months before to 5 months after the El Niño event shows that, the negative anomaly in geopotential height and anomalous northwest wind at the southwestern position of the study region are maximum 4 months after the El Niño peak, suppressing seawater evaporation, reducing ocean latent heat energy loss, and favoring SST increase and the generation of marine heatwaves.

When there is a positive SST anomaly in the eastern equatorial Pacific Ocean, a region of positive SST anomaly with a northwest-southeast tilt also appears in the South Indian Ocean, corresponding to the distribution of high cloud cover.

a method for studying interannual variation of marine heatwaves in the South Indian Ocean provided in the present disclosure addresses the unclear issue regarding the interannual variation and dynamic mechanisms of marine heatwaves in the South Indian Ocean (60° E-90° E, 15° S-25° S), and has the following advantages.

1. The occurrence of marine heatwaves in the South Indian Ocean is significantly influenced by ENSO events, and there is a clear interannual variation. The intensity of marine heatwaves in this region lags the peak of El Niño by 3 to 4 months, showing a significant positive correlation.

2. Analysis of the heat budget in the mixed layer indicates that the energy of marine heatwaves in the South Indian Ocean mainly originates from net surface heat flux, with shortwave radiation and latent heat playing major roles.

3. 3 to 4 months after the peak of El Niño, over the South Indian Ocean, it is controlled by positive geopotential height anomalies, and descending air currents lead to a decrease in low cloud cover, favoring the penetration of shortwave radiation into the ocean surface. Meanwhile, a shallower mixed layer makes the ocean surface more susceptible to warming, thereby promoting the formation of marine heatwaves.

4. Anomalous northwest wind suppresses the prevailing southeast wind, reducing evaporation and the loss of ocean latent heat energy, thereby rising SST and increasing marine heatwaves.

DETAILED DESCRIPTION OF THE EMBODIMENTS

Figure 1A:
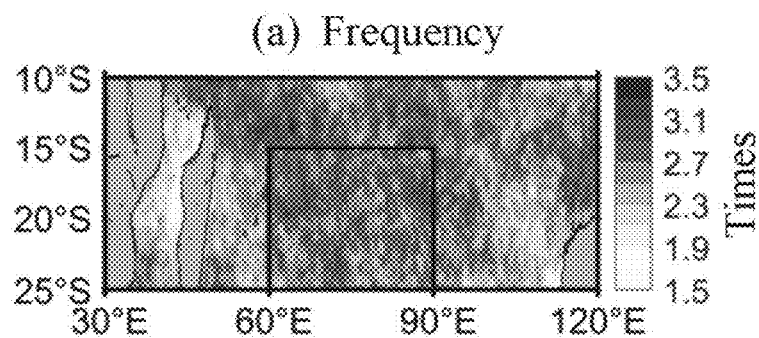
FIG. 1(a) shows the spatial distribution of frequency for marine heatwaves in the South Indian Ocean from 1982 to 2021.
Figure 1B:
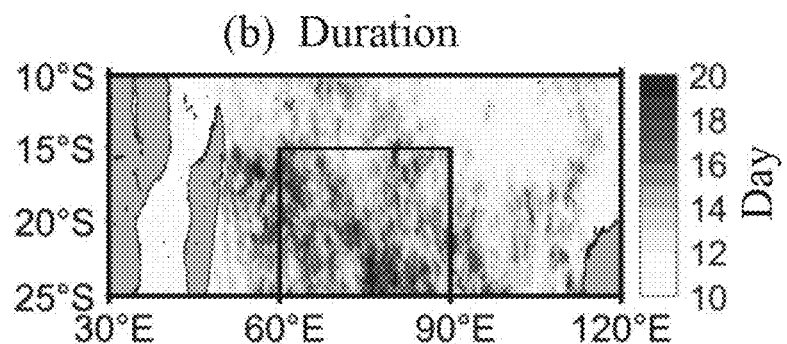
FIG. 1(b) shows the spatial distribution of duration for marine heatwaves in the South Indian Ocean from 1982 to 2021.
Figure 1C:
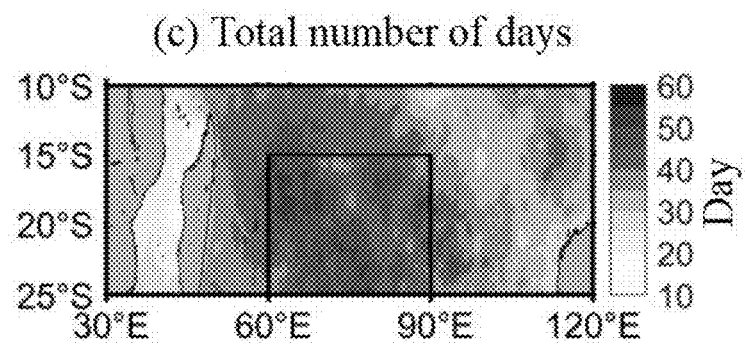
FIG. 1(c) shows the spatial distribution of the total number of days for marine heatwaves in the South Indian Ocean from 1982 to 2021.
Figure 1D:
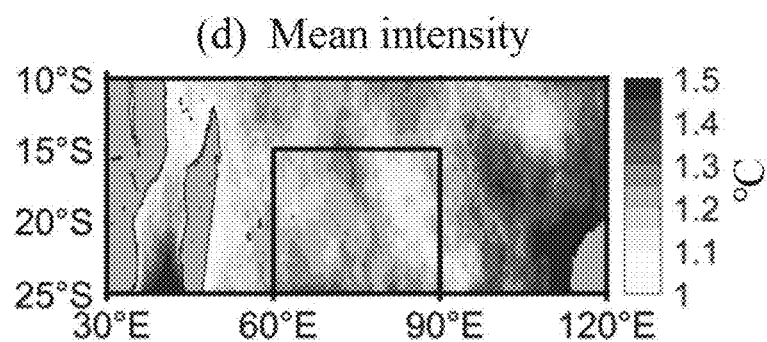
FIG. 1(d) shows the spatial distribution of mean intensity for marine heatwaves in the South Indian Ocean from 1982 to 2021.
Figure 1E:
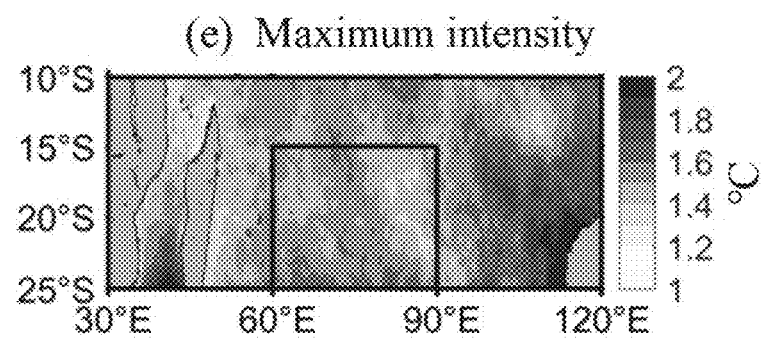
FIG. 1(e) shows the spatial distribution of maximum intensity for marine heatwaves in the South Indian Ocean from 1982 to 2021.
Figure 1F:
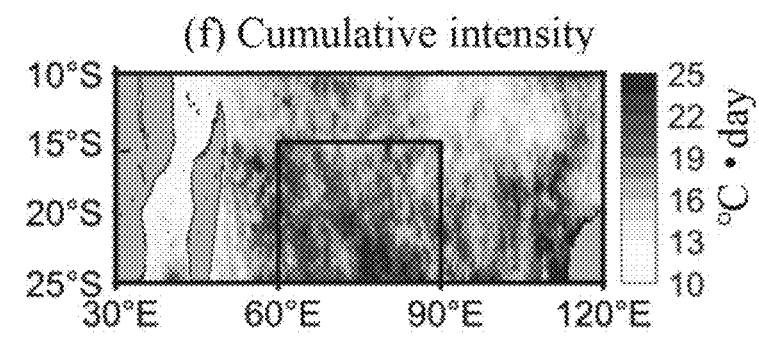
FIG. 1(f) shows the spatial distribution of cumulative intensity for marine heatwaves in the South Indian Ocean from 1982 to 2021.
Figure 2A:
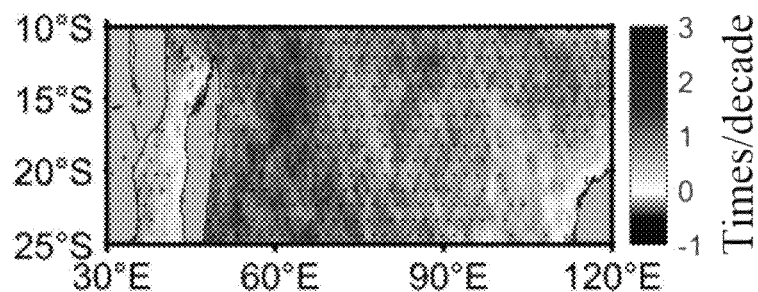
FIG. 2(a) shows the spatial distribution of frequency trend for marine heatwaves in the South Indian Ocean from 1982 to 2021.
Figure 2B:
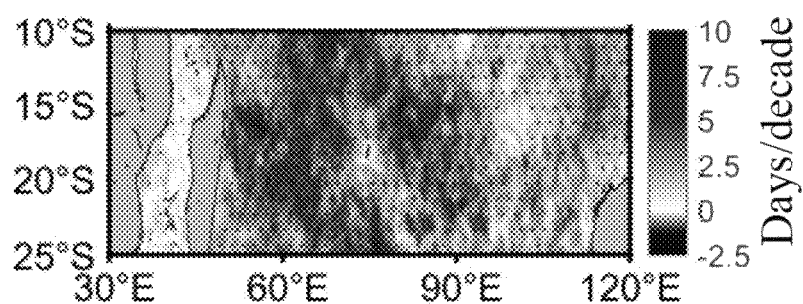
FIG. 2(b) shows the spatial distribution of duration frequency trend for marine heatwaves in the South Indian Ocean from 1982 to 2021.
Figure 2C:
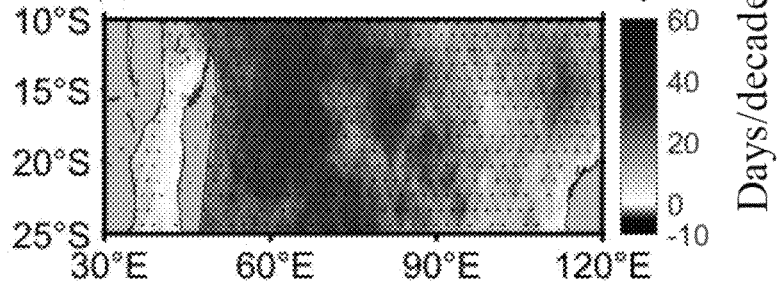
FIG. 2(c) shows the spatial distribution of the total number of days trend for marine heatwaves in the South Indian Ocean from 1982 to 2021.
Figure 2D:
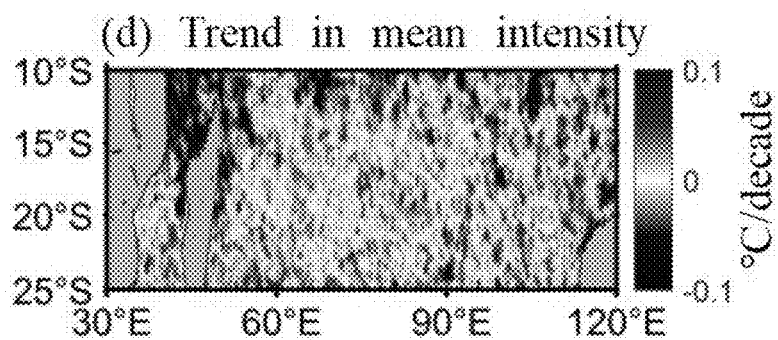
FIG. 2(d) shows the spatial distribution of mean intensity trend for marine heatwaves in the South Indian Ocean from 1982 to 2021.
Figure 2E:
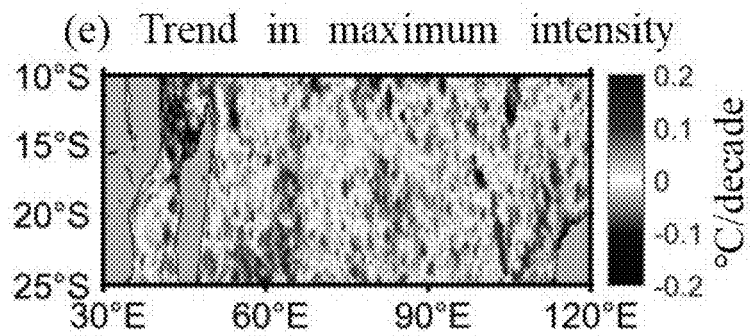
FIG. 2(e) shows the spatial distribution of maximum intensity trend for marine heatwaves in the South Indian Ocean from 1982 to 2021.
Figure 2F:
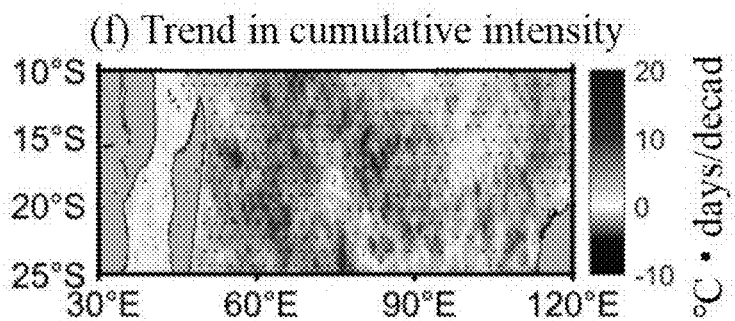
FIG. 2(f) shows the spatial distribution of cumulative intensity trend for marine heatwaves in the South Indian Ocean from 1982 to 2021.

Technical solutions in examples of the present disclosure will be described clearly and completely below. Obviously, the examples described are only some, rather than all examples of the present disclosure. On the basis of the examples of the present disclosure, all other examples obtained by those ordinary skilled in the art without creative efforts fall within the scope of protection of the present disclosure.

Example 1

A method for studying interannual variation of marine heatwaves in the South Indian Ocean includes the following steps.

Step 1, SST data, an OISST dataset, ECMWF Reanalysis V5, three-dimensional temperature and salinity data, and Niño 3.4 index data are acquired.

SST observation data is derived from the OISST V2.1 dataset of the National Oceanic and Atmospheric Administration (NOAA), and the selected data spans from Jan. 1, 1982 to Dec. 31, 2021, with a spatial resolution of 0.25°× 0.25°. The OISST dataset is a comprehensive product based on a multi-channel SST product of NOAA's advanced very high resolution radiometer (AVHRR), which is corrected using measured data from buoys, ships, and other sources, and then processed through optimal interpolation method.

With higher spatial resolution and good continuity, this dataset is widely applied in studying marine heatwaves.

To study the influence of atmospheric process on marine heatwaves, ECMWF Reanalysis V5, the fifth generation of global climate atmospheric reanalysis data provided by ECMWF is employed in the present disclosure, including monthly sea surface heat flux (positive downwards), sea-level pressure, 10-meter wind velocity, low cloud cover, high cloud cover, total cloud cover, and SST data, etc.

The data for sea surface flow field is derived from Ocean Reanalysis System 5 (ORAS5), a global ocean-sea ice reanalysis data product provided by ECMWF. This data product has a horizontal resolution of 0.25° and a vertical distribution of 75 layers.

The three-dimensional temperature and salinity data is derived from the fourth version of the "EN" series dataset from the Met Office Hadley Centre in the UK. Using optimal interpolation algorithms, this dataset provides three-dimensional temperature and salinity data based on available profiles and objective analyses. In the present disclosure, a depth of a mixed layer is calculated using the temperature and salinity data from this dataset. The EN4.2.2 version has a horizontal resolution of 1°×1°, 42 layers in the vertical direction, a depth range of 5-5500 meters, and a time span from 1901 to 2022.

In the present disclosure, the Niño 3.4 index from the Physical Sciences Laboratory Global Climate Observing System provided by NOAA is employed.

In the present disclosure, marine heatwaves are determined based on the daily SST data. Marine heatwaves are defined as "discontinuous prolonged events of abnormal warm water occurring at a particular location". Specifically, "discontinuous" refers to marine heatwaves being identifiable events with clear start and end dates, "prolonged" indicates a duration of at least 5 days, and "abnormal warm" means that SST exceeds a specific climatic threshold. Quantitatively, marine heatwaves last for at least 5 days, with daily SST exceeding the 90th percentile of a 30-year climatic mean. There are at least 2 days between two marine heatwave events, otherwise, they are considered as the same event. The specific feature indices are shown in Table 1. Additionally, the marine heatwave threshold is determined by calculating the 90th percentile threshold for each day using daily temperature values of all years within an 11-day period centered on a current day, followed by 31-day smoothing. This method ensures sufficient sample size, and the threshold varies with seasons.

TABLE 1

Definition of marine heatwave indices

| Feature index | Definition | Equation | Unit |
| --- | --- | --- | --- |
| Frequency (Freq) | Number of marine heatwaves that occur each year | $N$ | Times |
| Duration (Dura) | Average duration of marine heatwaves each year | $\sum_{i=1}^{N}(D_i)/N$ | Day |
| Total number of days | Total number of days of marine heatwaves that occur each year | $\sum_{i=1}^{N} D_i$ | Day |

TABLE 1-continued

Definition of marine heatwave indices

| Feature index | Definition | Equation | Unit |
| --- | --- | --- | --- |
| Mean intensity (iMean) | Mean value of SST anomalies during marine heatwaves each year | $\sum_{i}^{N}\sum_{j}^{D_i}(T_{ij} - \tilde{T}_{ij})/N$ | ° C. |
| Maximum intensity (iMax) | Maximum value of SST anomalies during marine heatwaves each year | $\sum_{i}^{N}\sum_{j}^{D_i}(\max(T_{ij} - \tilde{T}_{ij}))$ | ° C. |
| Cumulative intensity (iCum) | Cumulative sum of the product of the average duration and corresponding mean intensity during marine heatwaves each year | $\sum_{i}^{N}\sum_{j}^{D_i}(sum(T_{ij} - \tilde{T}_{ij}))$ | ° C. · day |

Note:
$D_i$ represents the duration of an $i_{th}$ occurrence, N represents the number of occurrences, and $T_{ij}$ and $\tilde{T}_{ij}$ are SST and the corresponding threshold on a $j_{th}$ day during marine heatwaves, respectively.

Step 2, spatial distribution features and linear variation trend features of marine heatwaves in the South Indian Ocean are investigated according to obtained OISST data.

FIG. 1(a)-FIG. 1(f) show the spatial distribution of six marine heatwave indices in the South Indian Ocean from 1982 to 2021, representing the heatwave frequency, duration, annual total number of days, mean intensity, maximum intensity, and cumulative intensity, respectively. The displayed values are annual means, with units of times, days, ° C. and ° C. day. It can be seen from FIG. 1(a)-FIG. 1(f) that the significant marine heatwave phenomena are present in the South Indian Ocean, the frequency of marine heatwaves in the South Indian Ocean is relatively uniform in spatial distribution, and regions with high values for duration and total number of days are located in the western part of the South Indian Ocean. The spatial distribution of mean intensity and maximum intensity is relatively lower in the western part of the South Indian Ocean, and the cumulative intensity is higher on the eastern part of Madagascar.

In the present disclosure, a region with longer duration and more total number of days is selected, i.e., a region of 60° E-90° E, 15° S-25° S (indicated by the black box in FIG. 1(a)-FIG. 1(f)), as the study region for marine heatwaves in the South Indian Ocean. Within this region, the mean intensity of marine heatwaves is 1.20° C., with a maximum intensity of 1.50° C., a cumulative intensity of 18.06° C./day, a duration of 14.12 days, a frequency of 2.74 times, and the total number of days of 45.22 days. Based on these six indices, the marine heatwave features in this region are reflected by a high number of days, long duration, high intensity, and relatively high frequency.

FIG. 2(a)-FIG. 2(f) show the spatial distribution of trends in six marine heatwave indices of the South Indian Ocean from 1982 to 2021, representing heatwave frequency, duration, annual total number of days, mean intensity, maximum intensity, and cumulative intensity, respectively, where black dots indicate significance at the 95% confidence test (unit: /decade). FIG. 2(a)-FIG. 2(f) show the spatial distribution trends of the six marine heatwave features indicated in FIG. 1(a)-FIG. 1(f), and show significant increase in the frequency, duration, total number of days, and cumulative intensity of marine heatwaves across the South Indian Ocean. In particular, the increasing trends in the western region are significantly higher than those in the eastern region. In the western region of the South Indian Ocean, the trend in marine heatwave frequency reaches 2 times per decade. The trends in duration, total number of days, and cumulative intensity are similar in spatial distribution, with the highest increasing trend in duration reaching 7.5 days per decade in the western region, the trend in total number of days reaching 40 days per decade, and the trend in cumulative intensity reaching 10° C. per decade. From FIG. 2(d) and FIG. 2(e), it can be seen that the mean intensity and maximum intensity of marine heatwaves show negative trends between 15°S and 10° S, with the largest negative trend occurring in the northwest part of Madagascar. However, within the entire study region (60° E-90° E, 15° S-25° S), both the mean intensity and maximum intensity also show increasing trends. In summary, within the study region of the present disclosure, all six feature indices of marine heatwaves in the South Indian Ocean exhibit positive increasing trends, which may further intensify with global warming.

Mann-Kendall method is a statistical approach commonly used to analyze trends in time series data. It can detect trends in data without assuming the distribution of the data, making it widely applied in various scenarios. The basic principle of this method involves that trends in data are tested based on the ranks of the observed data points. By calculating the ranks and using them to compute the Mann-Kendall test statistic, the trend and its significance level in the data can be determined. This method is widely applied in fields such as climate change, environmental science, and hydrology.

Figure 3A:
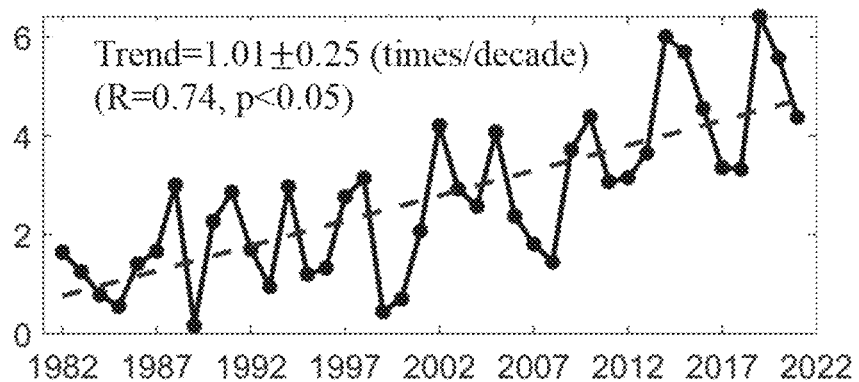
FIG. 3(a) shows the time series distribution of the weighted average of frequency for marine heatwaves within the study region of the South Indian Ocean from 1982 to 2021.
Figure 3B:
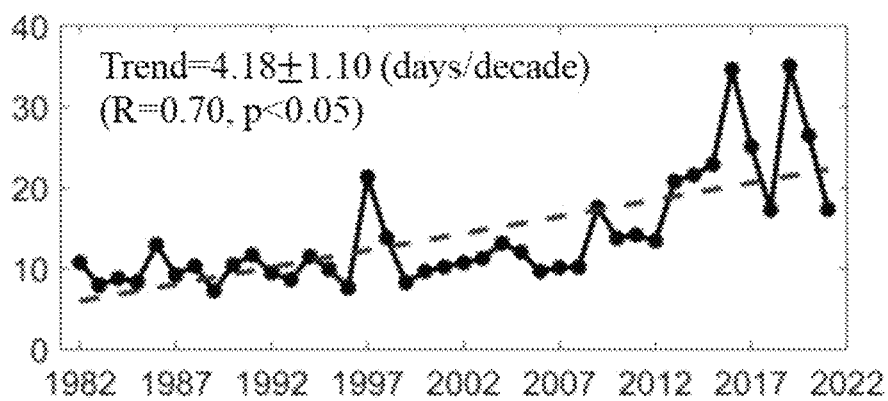
FIG. 3(b) shows the time series distribution of the weighted average of duration for marine heatwaves within the study region of the South Indian Ocean from 1982 to 2021.
Figure 3C:
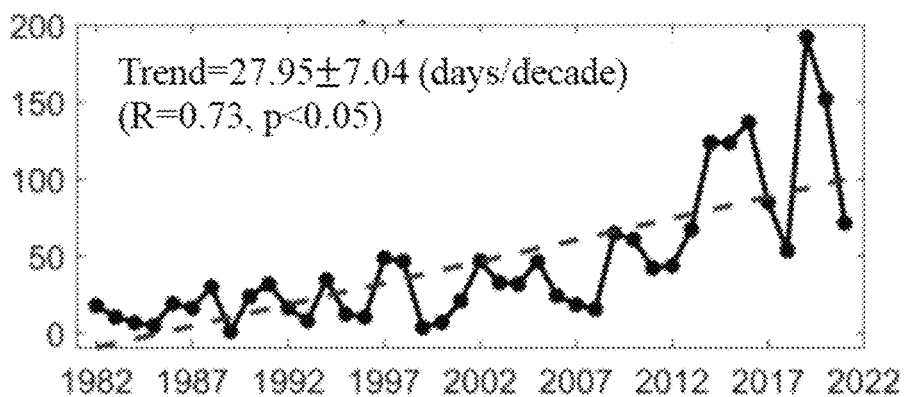
FIG. 3(c) shows the time series distribution of the weighted average of total number of days for marine heatwaves within the study region of the South Indian Ocean from 1982 to 2021.
Figure 3D:
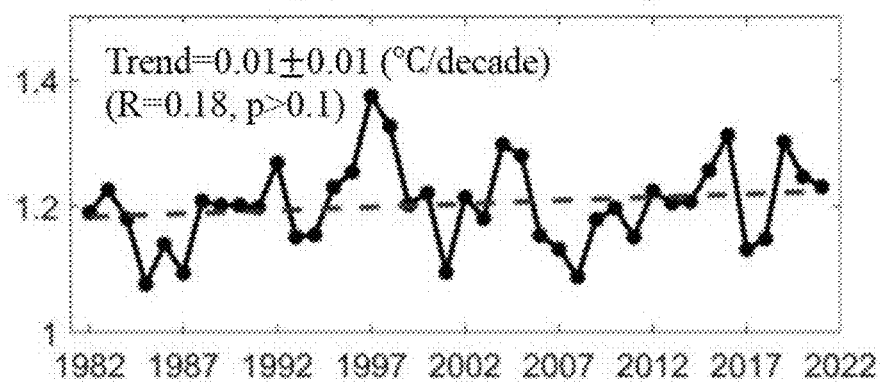
FIG. 3(d) shows the time series distribution of the weighted average of mean intensity for marine heatwaves within the study region of the South Indian Ocean from 1982 to 2021.
Figure 3E:
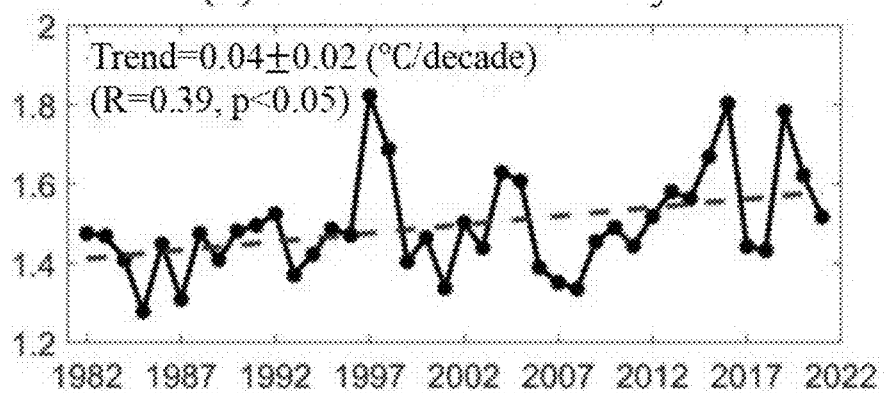
FIG. 3(e) shows the time series distribution of the weighted average of maximum intensity for marine heatwaves within the study region of the South Indian Ocean from 1982 to 2021.
Figure 3F:
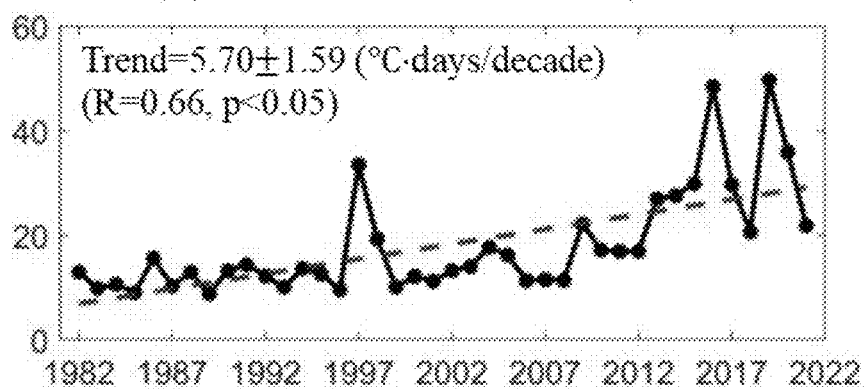
FIG. 3(f) shows the time series distribution of the weighted average of cumulative intensity for marine heatwaves within the study region of the South Indian Ocean from 1982 to 2021.

FIG. 3(a)-FIG. 3(f) show the time series distribution of weighted averages of marine heatwave feature indices within the study region of the South Indian Ocean from 1982 to 2021, where FIG. 3(a) represents occurrence frequency (unit: times/decade), FIG. 3(b) represents duration (unit: days/decade), FIG. 3(c) represents the total number of days (unit: days/decade), FIG. 3(d) represents mean intensity (unit: ° C./times/decade), FIG. 3(e) represents maximum intensity (unit: ° C./times/decade), and FIG. 3(f) represents cumulative intensity (unit: ° C./decade). The dashed lines represent linear trends, and the significance levels of p-values are calculated using the Mann-Kendall trend test. It can be seen form FIG. 3(a) to FIG. 3(f) that the weighted averages of all feature indices of marine heatwave region in the South Indian Ocean from 1982 to 2021 exhibit significant increasing trends. Significant high values for occurrence frequency, duration, and total number of days are distributed in 2019, and high values for mean intensity and maximum intensity are present in 1997. From FIG. 3(a), it can be seen that the growth rate of marine heatwave occurrence frequency is 1.01±0.25 times/decade, with a correlation coefficient (R) of 0.74, and peaks are present in 1982, 1988, 1991, 1994, 1998, 2002, 2005, 2010, 2015, and 2019, with the occurrence frequency exceeding 6 times in 2019. From FIG. 3(b), it can be seen that the growth rate of duration is 4.18±1.10 days/decade, with three significant peaks in 1997, 2016, and 2019. From FIG. 3(c), it can be seen that the regional annual average growth rate of total number of days is relatively significant, which is 27.95±7.04 days/decade, and obvious peaks also occur in 2016 and 2019. From FIG. 3(d) to FIG. 3(e), it can be seen that the regional annual averages of mean intensity and maximum intensity are distributed similarly, being maximum in 1997 and also exhibiting higher values in 2016 and 2019, with growth rates of 0.01±0.01° C./decade and 0.04±0.02° C./decade, respectively. From FIG. 3(f), it can be seen that cumulative intensity exhibits three significant peaks in 1997, 2016, and 2019.

Step 3, a Niño 3.4 index is calculated according to the obtained OISST data, and a lead-lag correlation analysis is performed between the Niño 3.4 index and the intensity of marine heatwaves in the South Indian Ocean to analyze the relationship between the intensity of marine heatwaves in the South Indian Ocean and ENSO process.

Previous studies have shown that ENSO can influence SST in the Indian Ocean region. Given this fact, the present disclosure further considers whether ENSO affects marine heatwaves in the Indian Ocean region. Therefore, the present disclosure will continue to investigate the correlation between ENSO and marine heatwaves in the Indian Ocean, to gain a deeper understanding. In the present disclosure, a time series graph of the Niño 3.4 index and intensity of marine heatwaves within the study region is plotted. In the present disclosure, regions where a Niño 3.4 index is greater than 0.5 standard deviation are regarded as El Niño events.

Figure 4:
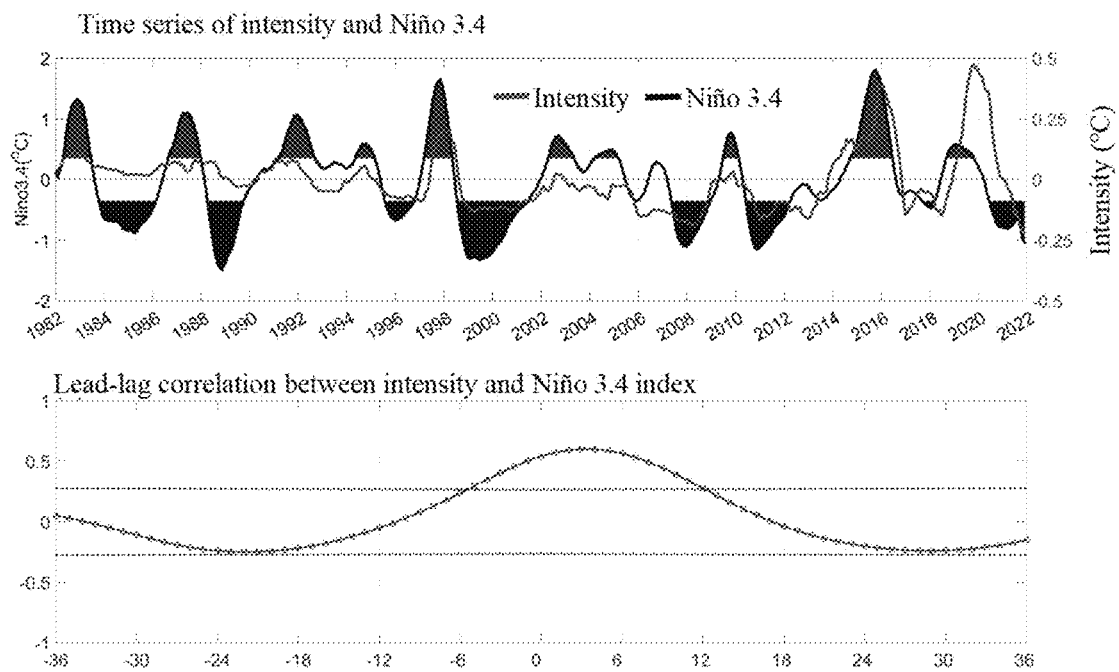
FIG. 4 shows the lead-lag correlation relationship between the Niño 3.4 index and monthly intensity of marine heatwaves anomalies.

FIG. 4 shows the lead-lag correlation relationship between the Niño 3.4 index and monthly intensity of marine heatwaves anomalies. The upper image shows Niño 3.4 index and monthly intensity of marine heatwaves anomalies in the South Indian Ocean (with trend removed), where black regions above the 0° scale represent regions where Niño 3.4 index is greater than 0.5 standard deviation, and black regions below the 0° scale represent regions where Niño 3.4 index is less than-0.5 standard deviation. The lower image shows the lead-lag correlation relationship between the Niño 3.4 index and monthly intensity of marine heatwaves anomalies. Positive values indicate that heatwave intensity lags the Niño 3.4 index.

From the upper image of FIG. 4, it can be observed that the time series of intensity of marine heatwaves anomalies in the South Indian Ocean, calculated based on OISST, exhibits consistent temporal variation with the Niño 3.4 index, and there is a good correspondence between Niño 3.4 index and intensity of marine heatwaves anomalies. In a case that Niño 3.4 index exhibits positive peaks (i.e., black regions above the 0° scale), the intensity of heatwaves anomalies also peaks. From the lower image of FIG. 4, it can be observed that there is a certain lagged response between intensity of marine heatwaves anomalies and Niño 3.4 index. Within the study region, the maximum correlation coefficient between heatwave intensity anomalies lagging the Niño 3.4 index by 3 months reaches 0.60 and passes the 95% confidence test, indicating a significant positive correlation between the two. That is, the intensity of marine heatwaves in the South Indian Ocean increases 3 months after the peak of the El Niño event.

Step 4, a spatial evolution of the marine heatwaves in the South Indian Ocean and SST anomalies during an El Niño event is analyzed.

Based on FIG. 4, the lead-lag correlation analysis indicates that the positive correlation relationship is present between the time series of the intensity of marine heatwaves anomalies in the South Indian Ocean and the Niño 3.4 index lagging by 3 months. The spatial evolution of the marine heatwaves in the South Indian Ocean during the development of El Niño is further analyzed in detail, that is, spatial evolution features of the marine heatwaves in the South Indian Ocean from 6 months before to 5 months after the peak of El Niño. In the present disclosure, the intensity of marine heatwaves in the South Indian Ocean during El Niño events is synthesized, and the evolution of its spatial distribution is shown in FIG. 5.

Figure 5:
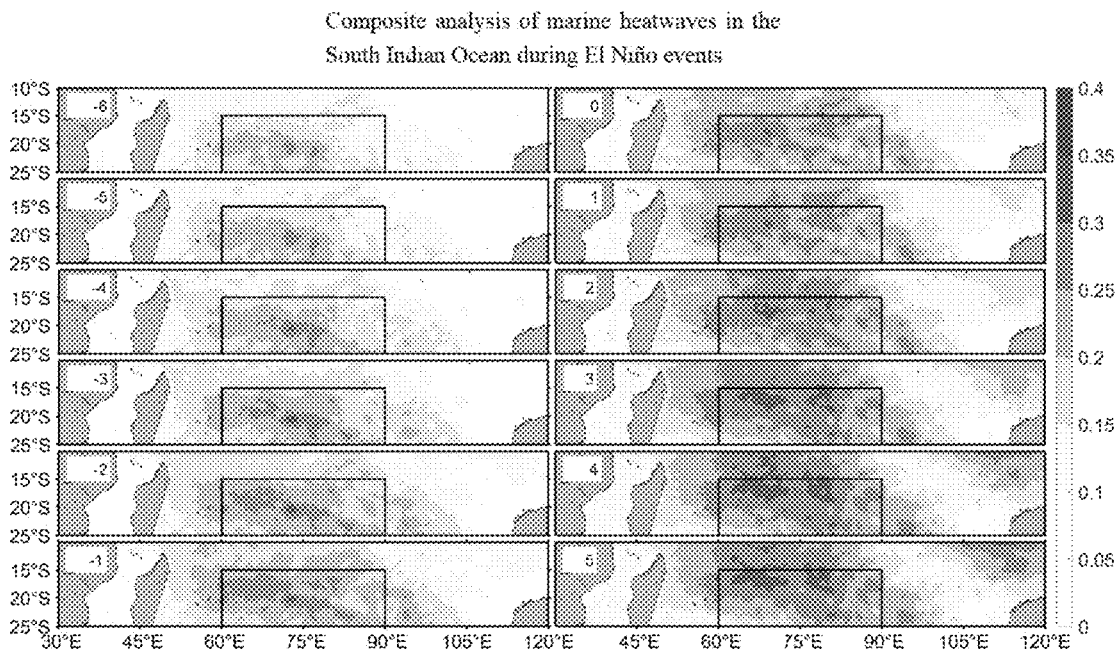
FIG. 5 shows the composite evolution of intensity of marine heatwaves in the South Indian Ocean from 6 months before to 5 months after the peak of El Niño event.

FIG. 5 shows the composite evolution of intensity of marine heatwaves in the South Indian Ocean from 6 months before to 5 months after the peak of El Niño event (unit: ° C.), with the black box outlining the study region. From the third image on the left column of FIG. 5, it can be seen that 4 months before the peak of El Niño, a high marine heatwave intensity value occurs at 74°E, 20° S, reaching 0.4° C. or more. From the last image on the left column of FIG. 5, it can be seen that, with the development of El Niño, the high marine heatwave intensity value slowly shifts westward, and the intensity of surrounding heatwaves continues to increase. 1 month before the peak of El Niño, a tilted high-intensity belt is formed. From the third and fifth images on the right column of FIG. 5, it can be seen that 2 months after the peak of El Niño, the high-value regions begin to expand, ultimately reaching maximum intensity and scope 4 months after the peak.

Figure 6:
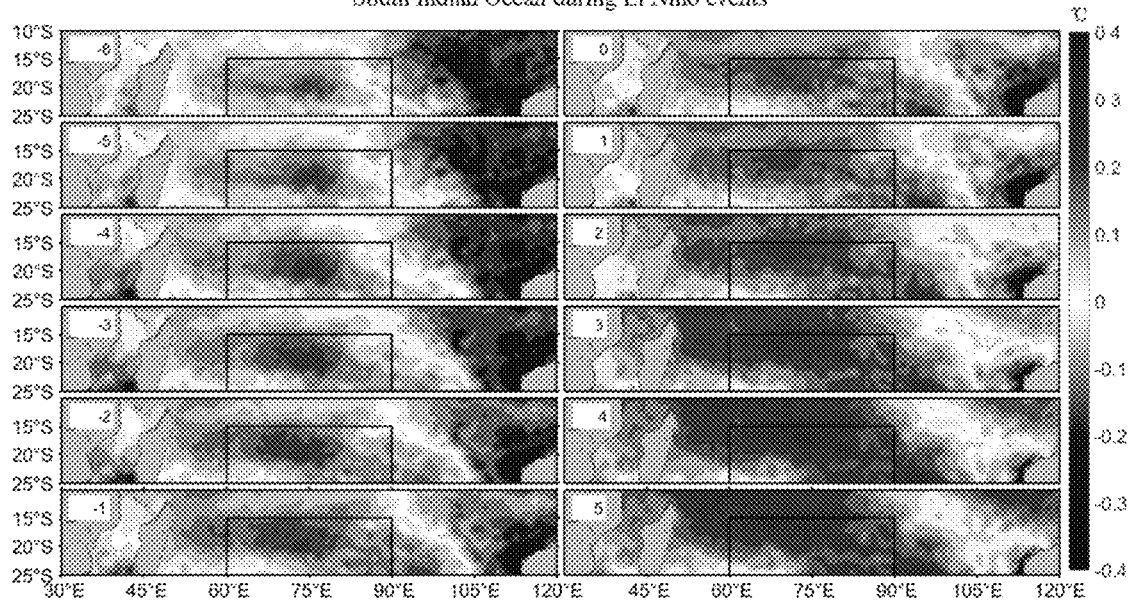
FIG. 6 shows the composite evolution of SST anomalies in the South Indian Ocean from 6 months before to 5 months after the peak of El Niño event.

FIG. 6 shows the composite evolution of SST anomalies in the South Indian Ocean from 6 months before to 5 months after the peak of El Niño event (unit: ° C.), with the black box outlining the study region. Since marine heatwaves are extreme warming events in the ocean, the present disclosure investigates the composite evolution of SST anomalies, to understand their relationship with marine heatwaves. It can be seen from FIG. 6 that, from 6 months before to 5 months after the peak of El Niño of El Niño, there is a significant positive anomaly in SST in the western part of the South Indian Ocean, with the intensity of this anomaly continuously increasing and its scope expanding. Additionally, in the Mozambique Channel, from 6 months before the peak of El Niño to 2 months after the peak of El Niño, there is a negative anomaly in SST, which gradually decreases over time and ultimately disappears. 3 to 4 months after the peak of El Niño, the positive anomaly in SST within the study region is maximum and corresponds well with intensity of marine heatwaves. Therefore, ENSO can influence intensity of marine heatwaves by influencing SST. By investigating the physical mechanisms of SST anomalies, the present disclosure can elucidate the physical mechanisms for the generation of marine heatwaves in the study region.

Step 5, energy contribution of the ocean and atmosphere to marine heatwave events during the El Niño event is analyzed through a heat budget of mixed layer.

In step 4, it obtains that the El Niño event is capable of regulating the intensity of marine heatwaves in the South Indian Ocean by influencing SST, and combined with the SST data, ECMWF Reanalysis V5 data, and the three-dimensional temperature and salinity data, quantitative analysis of the energy contribution of the ocean and atmosphere to marine heatwave events during the development of El Niño is further performed using a heat budget equation of mixed layer, to investigate physical mechanisms of the marine heatwaves in the South Indian Ocean.

In the present disclosure, the heat budget of mixed layer is analyzed, with the heat budget equation for mixed layer temperature being expressed as:

$$\frac{dT}{dt} = \frac{Q_{net}}{\rho C_p h} - V \cdot \nabla T - \frac{\omega_e (T - T_d)}{h} + R_{es} \quad (1)$$

where dT/dt represents a trend term of temperature, $$\frac{Q_{net}}{\rho C_p h}$$

represents a sea surface neat forcing term, indicating the contribution of sea surface heat flux to variations in SST, $Q_{net}$ representing a net surface heat flux, formed by the sum of longwave radiation, shortwave radiation, sensible heat, and latent heat; V·∇T represents a horizontal advective heat flux term, and $$\frac{\omega_e (T - T_d)}{h}$$

represents a vertical entrainment term; the residual term $R_{es}$ contains turbulent mixing at the bottom of a mixed layer, horizontal mixing and diffusion, and numerical model errors; $\rho=1025$ kg/m³ and $C_p=3990$ J/(kg·° C.) represent the density and specific heat capacity of seawater, respectively; h represents the depth of the mixed layer, T represents an average temperature of the mixed layer, and $T_d$ represents a temperature at the bottom of the mixed layer; when calculating the depth of the mixed layer, the temperature difference is set to 0.5° C., and $T-T_d$ is thus considered as a fixed value of 0.5° C.; V(u, v) represents a velocity vector, u and v representing zonal and meridional current velocities, respectively; and $\omega_e$ represents a vertical entrainment velocity $$\omega_e = \frac{dh}{dt} + h\left(\frac{\partial u}{\partial x} + \frac{\partial v}{\partial y}\right).$$

To obtain the anomaly for each term in the equation, each term in the equation is subtracted by its corresponding mean value in climatic state.

Figure 7:
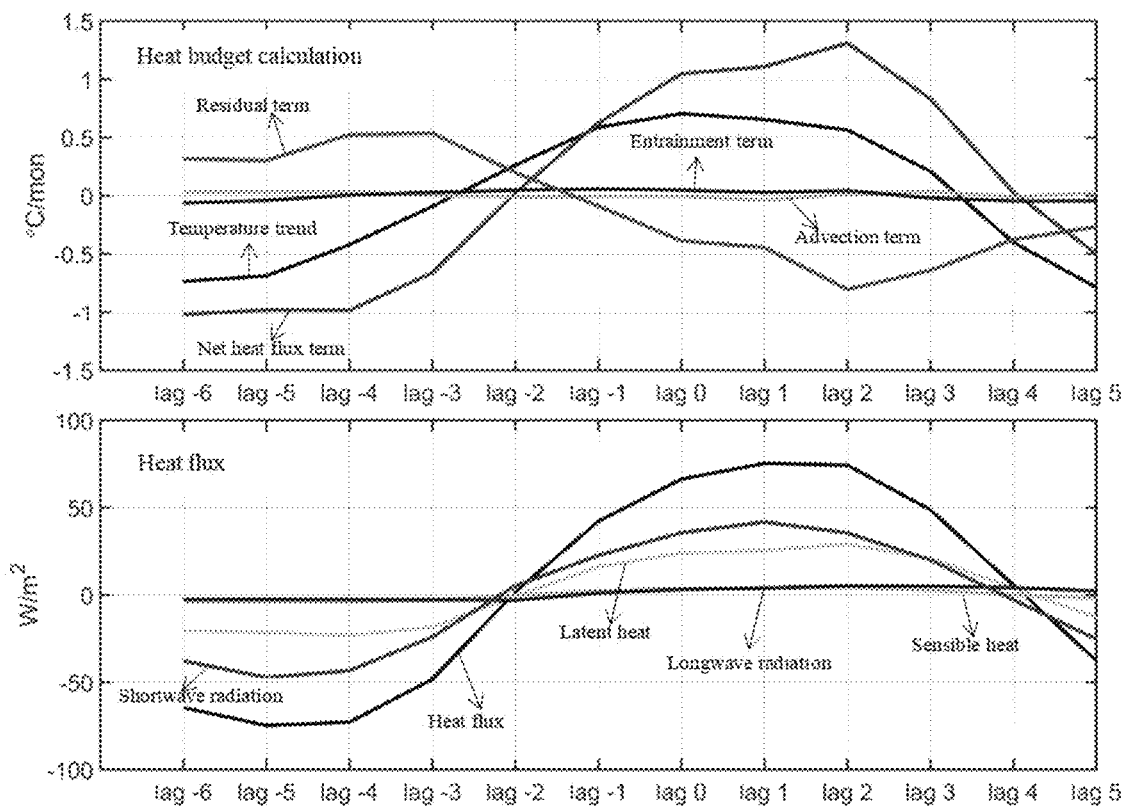
FIG. 7 shows the evolution of heat budget in the mixed layer during El Niño event and the evolution of heat flux from 6 months before to 5 months after El Niño event.

FIG. 7 shows the evolution of the heat budget of mixed layer during El Niño event and the evolution of heat flux from 6 months before to 5 months after El Niño event. The upper image of FIG. 7 shows the evolution of the heat budget of mixed layer during El Niño event (unit: ° C./month), including the temperature trend term, net surface heat flux term, ocean advection term, vertical entrainment and diffusion term, and residual term. The lower image of FIG. 7 shows the evolution of heat fluxes from 6 months before to 5 months after El Niño event (unit: W/m²), including the heat flux term, latent heat, sensible heat, longwave radiation, and shortwave radiation. All terms have had their long-term trends removed.

The results in the upper image of FIG. 7 indicate that from 6 months before to 5 months after El Niño event, the increase in mixed layer temperature is primarily influenced by the net surface heat flux, with the advection term and vertical entrainment term contributing less to variations in the temperature trend line. This is because the residual term, which may include bottom turbulence mixing, horizontal mixing, and errors between data, has a trend opposite to that of the temperature variation term. Additionally, the temperature trend term shifts from positive to negative 3 to 4 months after the peak of El Niño, when the mixed layer temperature is maximum. This aligns with the situation that the intensity of marine heatwaves lags 3 to 4 months of the Niño 3.4 index shown in FIG. 4. Simultaneously, the net surface heat flux also shifts from positive to negative 3 to 4 months after the peak of El Niño, which can be interpreted as the cumulative effect of heat. At this time, the mixed layer receives the most heat, favoring the generation and maintenance of marine heatwaves.

Step 6, whether the marine heatwaves in the South Indian Ocean are affected by shortwave radiation and latent heat modulated by the ENSO process is determined through regression analysis and composite analysis.

The previous results show that the net surface heat flux term plays a major role in contributing to the peak of marine heatwaves in the South Indian Ocean. In the present disclosure, combined with ECMWF Reanalysis V5 data, contributions of four components of the net surface heat flux: latent heat, sensible heat, longwave radiation, and shortwave radiation, are further analyzed.

It can be seen from the lower image of FIG. 7 that the accumulated heat flux is maximum within 3 to 4 months after the peak of El Niño. It is noteworthy that variations in heat flux are primarily controlled by shortwave radiation, with latent heat having a certain influence on heat flux. Additionally, sensible heat and longwave radiation contribute relatively less to heat flux.

Therefore, in summary, the energy of marine heatwaves in the South Indian Ocean mainly originates from net surface heat flux which is primarily controlled by shortwave radiation and latent heat.

In terms of linear trends, with global warming, all six marine heatwave feature indices show a gradual increase trend. Additionally, in the present disclosure, it is observed that years for some feature indices with high values coincide with ENSO years (e.g., 1997-1998). Therefore, the present disclosure hypothesizes that there may be a certain correlation between ENSO and marine heatwaves in the South Indian Ocean. To further verify this hypothesis, the present disclosure plans to conduct relevant research work.

Variations in local cloud cover may affect the heat flux between the ocean and atmosphere, and subsequently influence SST. To investigate the impact of El Niño events on cloud cover in the South Indian Ocean and reveal the physical mechanism of marine heatwaves in the South Indian Ocean, in the present disclosure, regression analysis is performed on three types of cloud cover (low cloud cover, high cloud cover, and total cloud cover) from 1982 to 2021. By regressing these three types of cloud cover onto the Niño 3.4 index, the corresponding spatial distribution fields are obtained in FIG. 8.

Figure 8:
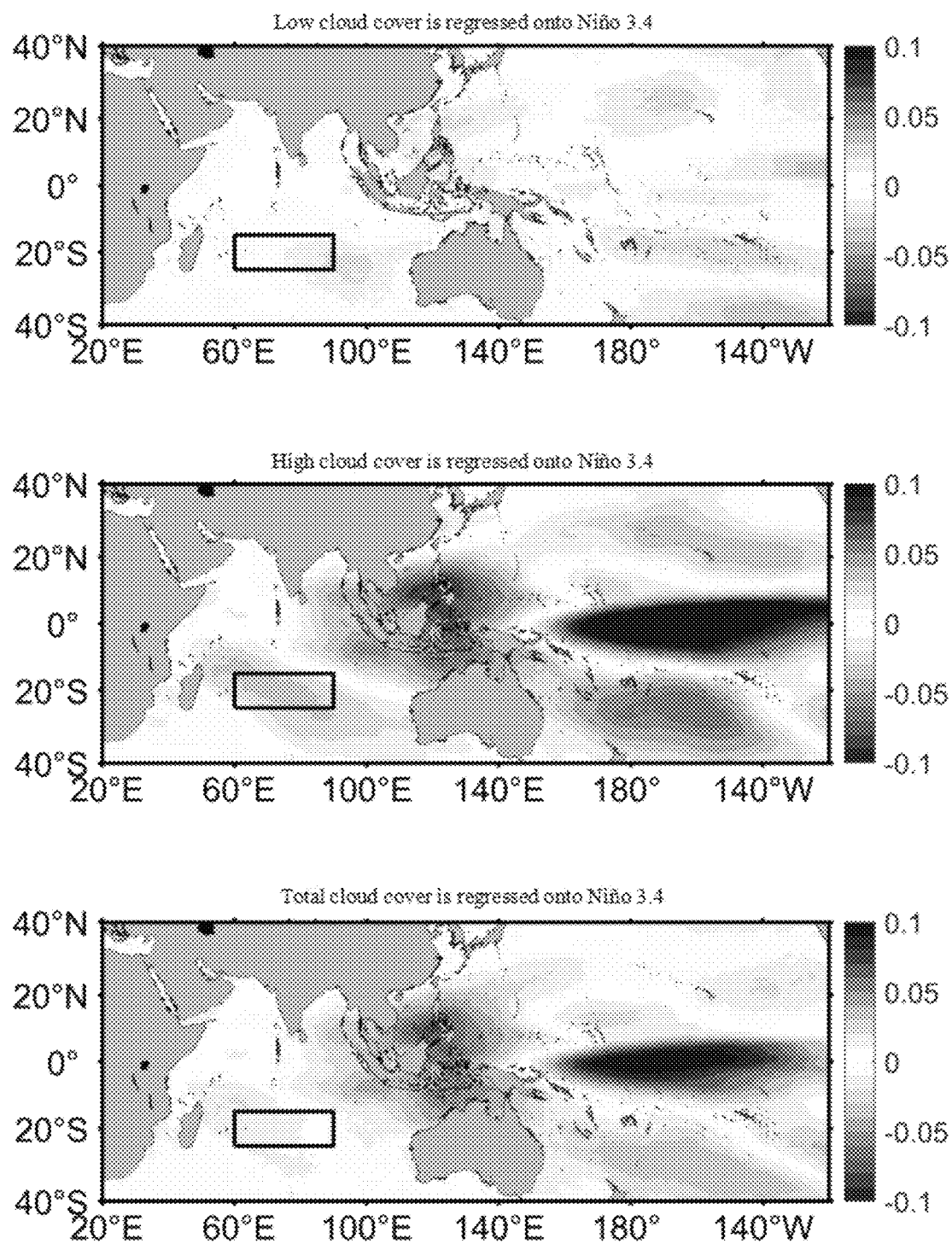
FIG. 8 shows the regression spatial distribution fields of low cloud cover, high cloud cover, and total cloud cover from 1982 to 2021.

FIG. 8 shows the regression spatial distribution fields of low, high, and total cloud cover from 1982 to 2021. The first image of FIG. 8 shows the spatial distribution field of low cloud cover regressed onto the Niño 3.4 index from 1982 to 2021, where the box represents the study region. The second image of FIG. 8 is the same as the first image, but is for high cloud cover. The last image of FIG. 8 is the same as the first image, but is for total cloud cover. According to the first image of FIG. 8, when SST in the equatorial Pacific (i.e., the Niño 3.4 region) increases, low cloud cover decreases, and there is a significant negative anomaly in low cloud cover in the South Indian Ocean. The reduction in low cloud cover favors the penetration of solar shortwave radiation into the ocean surface, heating the sea surface and thus contributing to the occurrence of marine heatwaves. The second image of FIG. 8 displays the spatial distribution of high cloud cover regressed onto the Niño 3.4 index. Cloud cover over the equatorial Pacific increases significantly, and there is also a notable increase in high cloud cover within the study region, with a tilted "northwest-southeast" belt of increased high cloud cover appearing in the South Indian Ocean. Higher SST can increase water vapor content in the atmosphere, promoting convective activity and making air ascent intensely, thereby favoring the formation of high cloud cover. High-level cloud has a certain reflective and scattering effect on solar radiation, but this effect is not as strong as that of low cloud. The last image of FIG. 8 indicates that during El Niño periods, total cloud cover over the South Indian Ocean shows an increasing trend, consistent with variations in total cloud cover over the equatorial Pacific. This further demonstrates a feedback mechanism between cloud and SST: the reduction in low cloud cover favors the penetration of shortwave radiation into the ocean, promoting ocean warming, while the increase in SST also intensifies air ascent, thereby favoring the formation of high cloud cover. This "positive feedback mechanism" leads to further increases in SST, sustaining or promoting the formation of low and high cloud cover, and creating a positive feedback loop.

Figure 9:
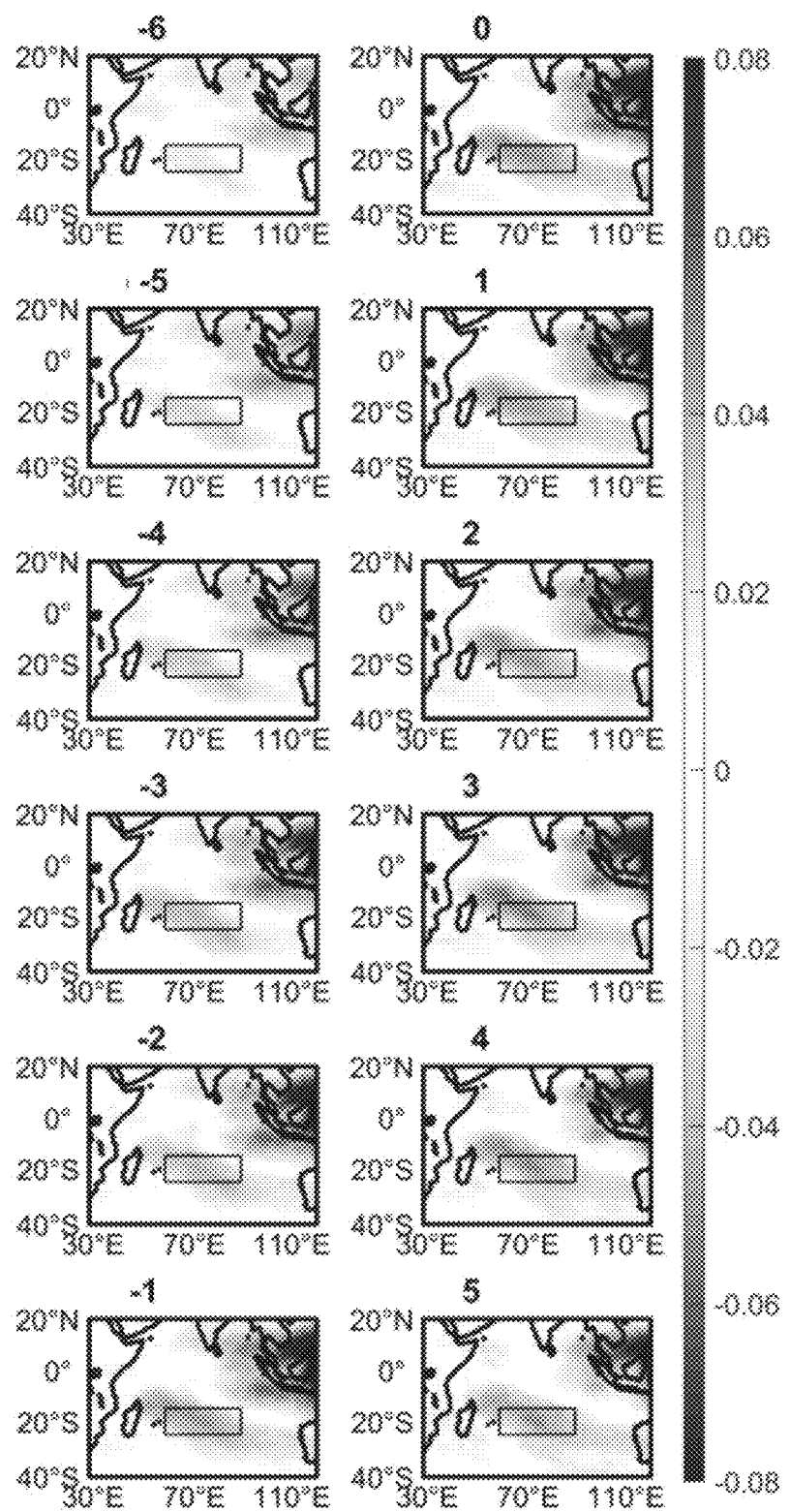
FIG. 9 shows the composite evolution of low cloud cover anomalies in the South Indian Ocean from 6 months before to 5 months after the peak of El Niño event.

To further analyze how low cloud cover in the South Indian Ocean affects marine heatwaves during El Niño periods, in the present disclosure, anomalies in low cloud cover during El Niño events from 1982 to 2021 are synthesized, and their evolution is presented in FIG. 9.

FIG. 9 shows the composite evolution of low cloud anomalies in the South Indian Ocean from 6 months before to 5 months after the peak of El Niño event, with the black box outlining the study region. From all the images on the left column and the first image on the right column of FIG. 9, it can be seen that low cloud cover shows significant negative anomalies throughout the study region from 6 months before the peak of El Niño to the peak of El Niño. From the second and third images on the right column of FIG. 9, it can be observed that during the decay phase of El Niño, low cloud cover gradually increases in the western part of the study region, but overall, the total cloud cover still decreases. The reduction in low cloud cover favors more shortwave radiation to penetrate into the ocean surface, thereby heating the ocean. During the development of El Niño, due to the large-scale reduction in low cloud cover, a significant amount of shortwave radiation penetrates into the ocean, promoting ocean warming. 3 to 4 months after the peak of El Niño, SST reaches maximum.

Figure 10:
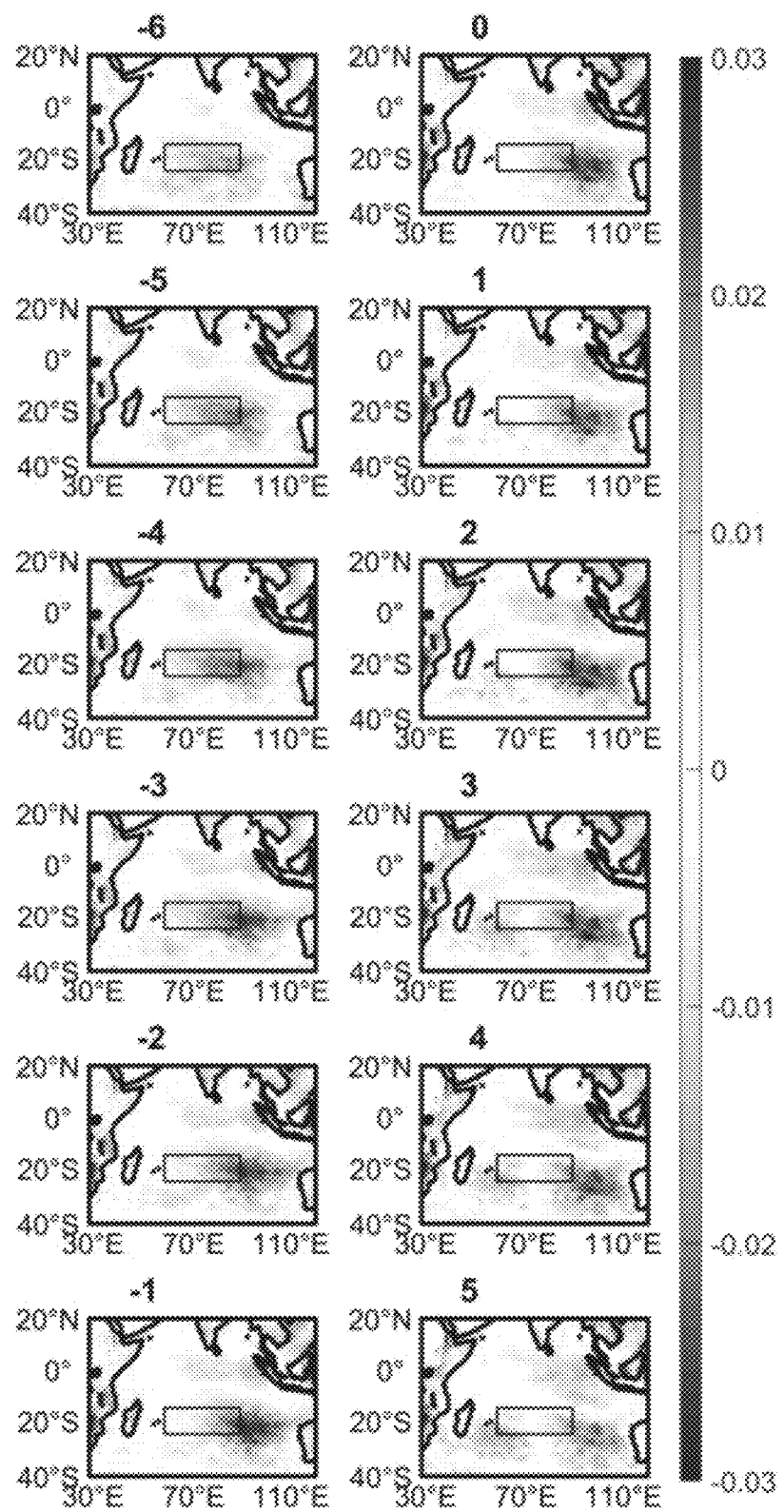
FIG. 10 shows the composite evolution of high cloud cover anomalies in the South Indian Ocean from 6 months before to 5 months after the peak of El Niño event.

FIG. 10 shows the composite evolution of high cloud cover anomalies in the South Indian Ocean before and after the peak of El Niño event, with the black box outlining the study region. It can be seen from the fourth and fifth images on the right column of FIG. 10, before and after the peak of the El Niño event, significant positive anomalies appear in high cloud cover, with the maximum positive anomaly in high cloud cover occurring 3 to 4 months after the peak of the El Niño event.

By comprehensively analyzing FIG. 9 and FIG. 10, it can be seen that there is a lag relationship between low cloud cover and marine heatwaves. The reduction in low cloud cover leads to a gradual increase in SST, which peaks 3 to 4 months after the El Niño peak period. However, the response between high cloud cover and SST is relatively rapid: when SST is higher, high cloud cover heats the atmosphere, enhancing ascent air currents, which favors the formation of high cloud cover.

Figure 11:
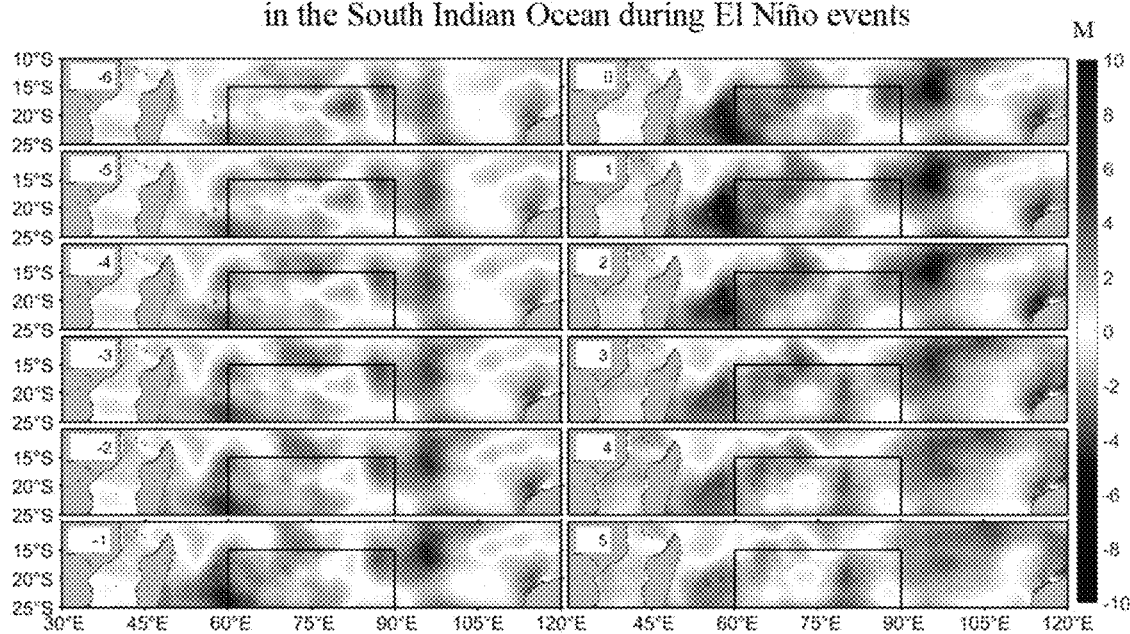
FIG. 11 shows the composite evolution of mixed layer depth anomalies in the South Indian Ocean from 6 months before to 5 months after the peak of El Niño event.

FIG. 11 shows the composite evolution of mixed layer depth anomalies in the South Indian Ocean from 6 months before to 5 months after the peak of El Niño event, with unit in m, and the black box outlining the study region. From FIG. 11, it can be seen that, 6 months before the peak of El Niño, the depth of mixed layer in the western part of the study region generally exhibits negative anomalies. In the eastern part of the study region, particularly at 80° E, there is a significant positive anomaly in the depth of mixed layer, reaching 6 meters. As El Niño develops, this positive anomaly gradually weakens and even turns negative 3 months after the peak. Additionally, it can be seen from the second image on the right column of FIG. 11, the negative anomaly signal in the depth of mixed layer at 60° E gradually intensifies, being maximum 1 month after the peak. It can be seen from the fourth image on the right column of FIG. 11 that 3 months after the peak, a positive anomaly signal appears at 75° E, 20° S and continues to intensify.

In summary, the present disclosure reveals that within 2 to 3 months after the peak of the El Niño event, the depth of mixed layer in the study region overall shows a decreasing trend, which favors the warming of the ocean surface. The net surface heat flux terms equals to the increase of $\rho C_p h$ and $Q_{net}$, and the decrease of the depth of mixed layer h, further favoring ocean heating, thereby promoting the formation of marine heatwaves.

To investigate how sea surface pressure and wind influence local marine heatwaves by affecting SST, regression maps of SST, sea-level pressure, and wind velocity are plotted in the present disclosure.

Figure 12:
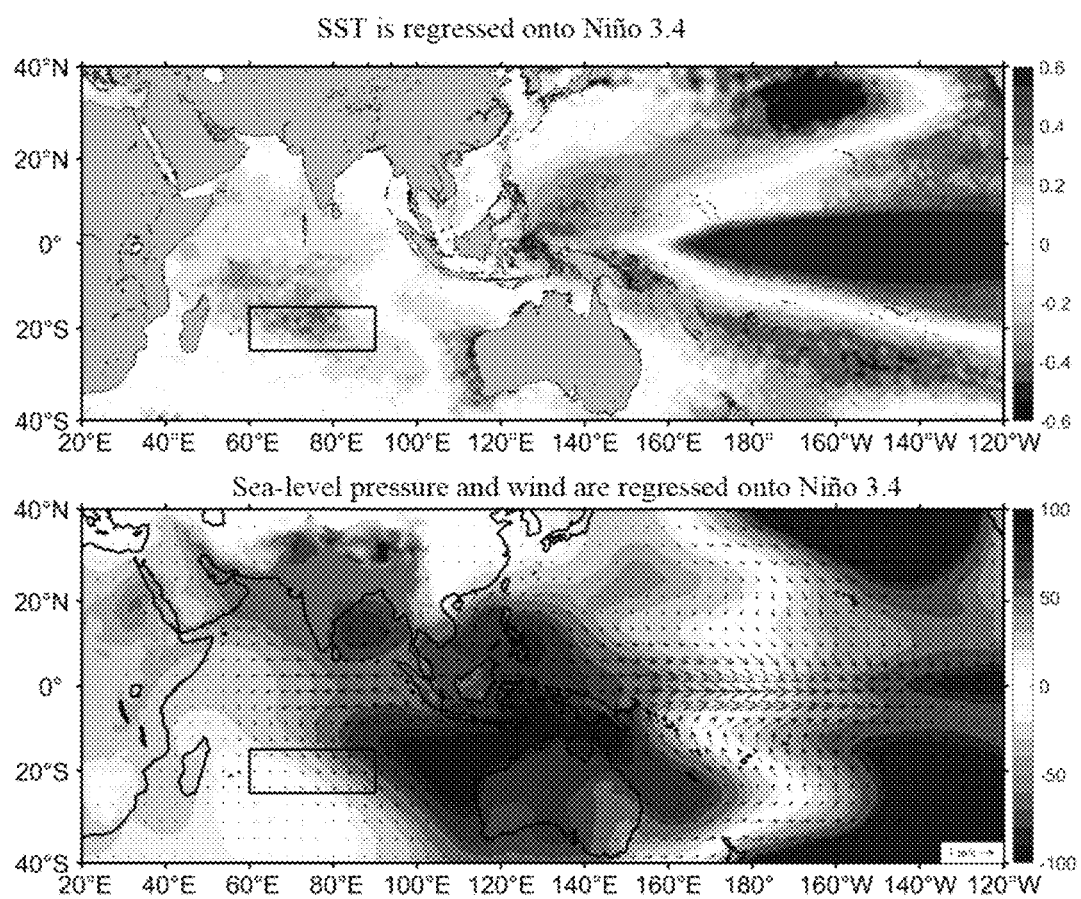
FIG. 12 shows the regression spatial distribution fields, sea-level pressure, and wind velocity.

FIG. 12 shows the regression spatial distribution fields, sea-level pressure, and wind velocity. The upper image of FIG. 12 shows the regression spatial distribution field between SST and the Niño 3.4 index from 1982 to 2021 (unit: ° C.), with the black box outlining the study region. The lower image of FIG. 12 shows the regression spatial distribution field between sea-level pressure (unit: hPa) and wind velocity (unit: m/s) and the Niño 3.4 index from 1982 to 2021. The upper image of FIG. 12 shows the spatial field obtained by regressing SST from 1982 to 2021 onto the Niño 3.4 index. It can be seen from the image that, when there is a significant positive SST anomaly in the eastern equatorial Pacific Ocean, a region of positive SST anomaly with a northwest-southeast tilt also appears in the South Indian Ocean, corresponding to the distribution of high cloud cover. Combined with the previous research, the present disclosure can conclude that the positive SST anomalies in the South Indian Ocean are modulated by El Niño. It can be seen from the lower image of FIG. 12, within the study region, SST anomalies are primarily controlled by positive sea-level pressure. The high pressure control favors an increase in SST, because the sinking air currents in high-pressure regions can suppress wind velocity over the ocean surface, reducing heat loss and thus leading to an increase in SST. Additionally, this region is controlled by anomalous northwest wind, and the study region is affected by southeast wind in climatic state. The presence of anomalous northwest wind suppresses the southeast wind in climatic state, reducing moisture evaporation and the loss of ocean latent heat energy, thereby increasing SST.

Figure 13:
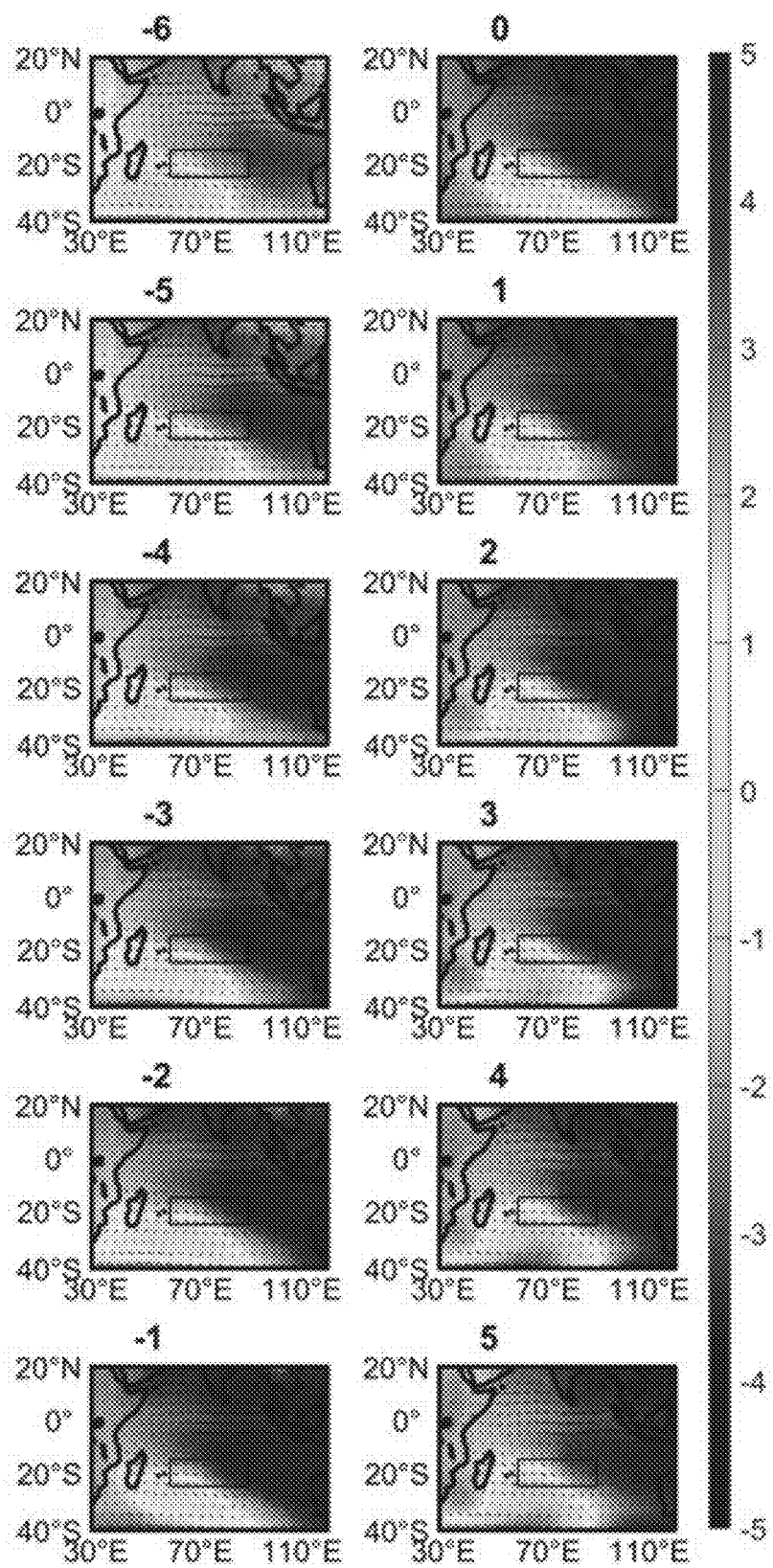
FIG. 13 shows the composite evolution of geopotential height anomalies and wind velocity anomalies at 850 hPa in the South Indian Ocean from 6 months before to 5 months after the peak of El Niño event.
Figure 14:
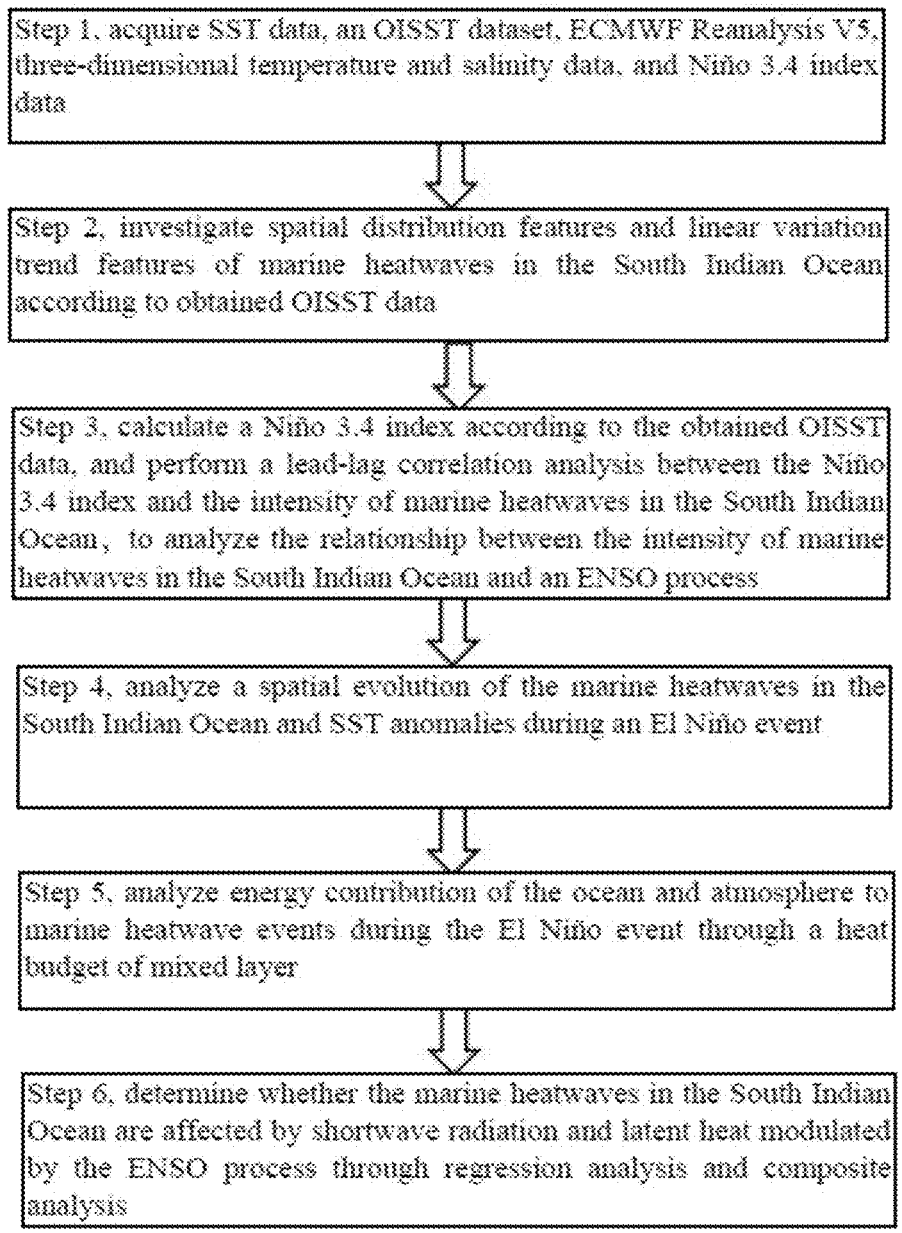
FIG. 14 shows a flowchart of a method for studying interannual variation of marine heatwaves in the South Indian Ocean.

FIG. 13 shows the composite evolution of geopotential height anomalies and wind velocity anomalies at 850 hPa in the South Indian Ocean from 6 months before to 5 months after the peak of El Niño event, with the black box outlining the study region. It can be observed from FIG. 13 that there is a negative geopotential height anomaly signal in the southwest of the study region and a positive geopotential height anomaly signal in the northeast. The study region is located at the intersection of these two signals, thus being controlled by anomalous northwest wind. During El Niño events, the positive signal intensifies while the negative signal weakens, leading to an increase in the gradient between the two signals. The fifth image on the right column of FIG. 13 shows that this gradient is maximum 4 months after the peak of El Niño. Therefore, the anomalous northwest wind intensifies, and suppresses moisture evaporation and latent heat loss from the ocean, favoring an increase in SST and the occurrence of marine heatwaves.

Although the contents of the present disclosure have been described in detail through the above preferred examples, it is to be appreciated that the above description are not to be considered as limitations to the present disclosure. Various modifications and alternatives to the present disclosure will be apparent to those skilled in the art upon reading the foregoing. Accordingly, the scope of protection of the present disclosure are defined by the attached claims.

The invention claimed is:

1. A method for studying interannual variation of marine heatwaves in the South Indian Ocean, comprising the following steps:
   step 1, acquiring Niño 3.4 index data, an Optimal Interpolation Sea Surface Temperature (OISST) dataset, and sea surface temperature (SST) data with a spatial resolution of 0.25°×0.25°, and acquiring sea surface flow field data with a horizontal resolution of 0.25° and a vertical distribution of 75 layers, and three-dimensional temperature and salinity data with a horizontal resolution of 1°×1° and a vertical distribution of 42 layers; and calculating a mixed layer depth by utilizing the three-dimensional temperature and the salinity data, and determining marine heatwaves according to the SST data;
   the mixed layer depth ranging from 5-5500 m; a duration of the marine heatwaves ≥5 days, an interval time of two adjacent times of marine heatwaves ≥2 days, and daily SST data exceeding the 90th percentile of the 30-year climatic mean;
   step 2: selecting a study region for the marine heatwaves in the South Indian Ocean, and investigating spatial and temporal distribution features of six indicators of the marine heatwaves in the South Indian Ocean, which is bounded by 60° E to 90° E, 15°S to 25° S, the six indicators comprising mean intensity, maximum intensity, cumulative intensity, duration, frequency, and total number of days;
   the mean intensity being 1.20° C., the maximum intensity being 1.50° C., the cumulative intensity being 18.06° C., the duration being 14.12 days, the frequency being 2.74 times, and the total number of days being 45.22 days;
   step 3: investigating whether ENSO affects the marine heatwaves in the South Indian Ocean region, considering regions with the Niño 3.4 index greater than 0.5 standard deviation as El Niño events, plotting a time series map between the Niño 3.4 index and intensity of the marine heatwaves, and performing lead-lag correlation analysis between the Niño 3.4 index and the intensity of the marine heatwaves, to obtain the relationship between the intensity of the marine heatwaves in the South Indian Ocean and an ENSO process;
   step 4: analyzing the spatial evolution of the marine heatwaves in the South Indian Ocean during El Niño events, synthesizing the intensity of marine heatwaves during El Niño periods, analyzing the composite evolution of SST anomalies, studying the relationship between SST anomalies and the marine heatwaves, determining that ENSO influences the intensity of marine heatwaves by affecting SST, and obtaining a physical mechanism of the marine heatwaves in the study region by investigating the physical mechanism of SST anomalies;
   step 5: using the SST data, ECMWF Reanalysis V5 data, and three-dimensional temperature and salinity data to quantitatively analyze the energy contributions of the ocean and atmosphere to marine heatwave events during El Niño development using a mixed-layer heat budget equation, and investigating the physical mechanism of marine heatwaves in the South Indian Ocean; the mixed-layer heat budget equation being:

$$\frac{dT}{dt} = \frac{Q_{net}}{\rho C_p h} - V \cdot \nabla T - \frac{\omega_e(T - T_d)}{h} + R_{es} \quad (1)$$

where $$\frac{dT}{dt}$$

represents a trend term of temperature, $$\frac{Q_{net}}{\rho C_p h}$$

represents a sea surface heat forcing term, indicating the contribution of sea surface heat flux to variations in SST, $Q_{net}$ representing a net surface heat flux, formed by the sum of longwave radiation, shortwave radiation, sensible heat, and latent heat; $V \cdot \nabla T$ represents a horizontal advective heat flux term, and $$\frac{\omega_e(T - T_d)}{h}$$

represents a vertical entrainment term; the residual term $R_{es}$ contains turbulent mixing at the bottom of a mixed layer, horizontal mixing and diffusion, and numerical model errors; $\rho = 1025$ kg/m$^3$ and $C_p = 3990$)/(kg·° C.) represent the density and specific heat capacity of seawater, respectively; h represents the depth of the mixed layer, T represents an average temperature of the mixed layer, and $T_d$ represents a temperature at the bottom of the mixed layer; V(u, v) represents a velocity vector, u and v representing zonal and meridional current velocities, respectively; and $\omega_e$ represents a vertical entrainment velocity, $$\omega_e = \frac{dh}{dt} + h\left(\frac{\partial u}{\partial x} + \frac{\partial v}{\partial y}\right);$$

and step 6: analyzing the contributions of latent heat, sensible heat, longwave radiation, and shortwave radiation in the net surface heat flux using ECMWF Reanalysis V5 data, to obtain the energy source of the marine heatwaves in the South Indian Ocean, using regression analysis to determine the impact of El Niño events on cloud cover in the South Indian Ocean, and determining that how sea surface pressure and wind affect marine heatwaves by influencing SST, wherein the regression analysis is regressing three types of cloud cover onto the Niño 3.4 index to obtain spatial distribution fields of low, high, and total cloud cover in the South Indian Ocean, revealing the impact of El Niño events on cloud cover in the South Indian Ocean; and the obtaining spatial distribution fields of low, high, and total cloud cover in the South Indian Ocean comprises: analyzing how low cloud cover in the South Indian Ocean affects marine heatwaves during El Niño periods, and synthesizing the anomalous evolution of low cloud cover during El Niño periods; before and after the peak of El Niño events, synthesizing the anomalous evolution of high cloud cover and the anomalous evolution of mixed layer depth anomalies in the South Indian Ocean, to obtain the overall variation of mixed layer depth and its impact on the marine heatwaves within 2 to 3 months after the peak of El Niño.

2. The method according to claim 1, wherein in Equation (1), a value of T–$T_d$ is 0.5° C.

3. The method according to claim 1, wherein in step 6, the influence of sea surface pressure and wind on marine heatwaves by affecting SST is obtained by synthesizing the evolution of geopotential height anomalies at 850 hPa and wind speed anomalies in the South Indian Ocean when plotting regression maps of SST, sea-level pressure, and wind direction.

* * * * *